(12) United States Patent
Lee et al.

(10) Patent No.: US 12,165,198 B2
(45) Date of Patent: *Dec. 10, 2024

(54) GROUP ACCOUNT SERVICE PROVIDING SERVER AND METHOD

(71) Applicant: KAKAOBANK CORP., Gyeonggi-do (KR)

(72) Inventors: Byeoung Su Lee, Gyeonggi-do (KR); Hyung Keun Song, Gyeonggi-do (KR); Jin Woo Kim, Gyeonggi-do (KR); Eun Hyi Kho, Gyeonggi-do (KR); Jung Hee Ko, Gyeonggi-do (KR); Jong Hwan Oh, Gyeonggi-do (KR); Geun Won Mo, Gyeonggi-do (KR); Sung Jun Kim, Gyeonggi-do (KR); Jong Sun Yoo, Gyeonggi-do (KR); Yong Jun Kim, Gyeonggi-do (KR); Tae Wan Kim, Gyeonggi-do (KR); Seon Beom Lee, Gyeonggi-do (KR); Jin Han, Gyeonggi-do (KR)

(73) Assignee: KAKAOBANK CORP., Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/371,021

(22) Filed: Sep. 21, 2023

(65) Prior Publication Data
US 2024/0013291 A1    Jan. 11, 2024

Related U.S. Application Data

(63) Continuation of application No. 18/048,159, filed on Oct. 20, 2022, now Pat. No. 11,803,900, which is a
(Continued)

(30) Foreign Application Priority Data

Nov. 28, 2018   (KR) .................. 10-2018-0149385

(51) Int. Cl.
*G06Q 20/40*   (2012.01)
*G06Q 20/38*   (2012.01)
(Continued)

(52) U.S. Cl.
CPC .......... *G06Q 40/02* (2013.01); *G06Q 20/389* (2013.01); *G06Q 20/401* (2013.01)

(58) Field of Classification Search
None
See application file for complete search history.

(56) References Cited

U.S. PATENT DOCUMENTS

2009/0001947 A1*  1/2009  Ravichandran ..... H02M 3/1588
                                                               323/271
2013/0054454 A1   2/2013  Purves et al.
(Continued)

FOREIGN PATENT DOCUMENTS

KR   10-2003-0020363 A    3/2003
KR       10-0855380 B1    9/2008
(Continued)

OTHER PUBLICATIONS

I) Impact of Mobile Technologies on Customer Behaviour and Its Implications for Banks, IEEE (Year: 2006).*
Ii) Big Data Analysis on Demographic Characteristics of Chinese Mobile Banking Users, IEEE (Year: 2017).*
(Continued)

*Primary Examiner* — Bruce I Ebersman
*Assistant Examiner* — Bhavin D Shah
(74) *Attorney, Agent, or Firm* — Harness, Dickey & Pierce, P.L.C.

(57) ABSTRACT

According to one aspect of the present invention, a group account service providing server capable of converting a private account into a group account in real time through a terminal of the host of a comprises: an account management unit configured to convert a first account into a group account when a group account conversion request for the
(Continued)

first account of a host of a group is generated; a transaction ledger management unit configured to record change information in a transaction ledger for the group account when the change information including at least one of a transaction occurrence event and an information occurrence event is generated for the group account; a virtual ledger management unit configured to generate a virtual ledger to be mapped to the transaction ledger when the first account is changed to the group account.

15 Claims, 24 Drawing Sheets

Related U.S. Application Data continuation of application No. 17/291,068, filed as application No. PCT/KR2019/016292 on Nov. 25, 2019, now abandoned.

(51) Int. Cl.
   *G06Q 40/02* (2023.01)
   *H04L 9/40* (2022.01)

(56) References Cited

U.S. PATENT DOCUMENTS

| | | |
|---|---|---|
| 2017/0034023 A1 | 2/2017 | Nickolov et al. |
| 2017/0118622 A1 | 4/2017 | Jiang |

FOREIGN PATENT DOCUMENTS

| | | |
|---|---|---|
| KR | 10-2015-0001511 A | 1/2015 |
| KR | 10-2016-0128606 A | 11/2016 |
| KR | 10-2018-0116711 A | 10/2018 |

OTHER PUBLICATIONS

International Search Report from corresponding PCT Application No. PCT/KR2019/016292, dated Jun. 23, 2020.
Dec. 27, 2016 [Online]. non-official translation (Woori U Gathering Bankbook Product Manual. Woori Bank) [Retrieved on Apr. 27, 2020], Retrieved from: <URL: https://spot.wooribank.com/pto/bbs?cmd=download&BOARD_ID=B00176&ARTICLE_ID=4654&ATTACH_ID=25904>, See pp. 1-2.
Oct. 18, 2018, [Online], non-official translation (TOSS—If an Account is Needed for a Gathering?. Toss Official blog)., [Retrieved on Apr. 27, 2020], Retrieved from: <URL: http://blog.toss.im/2018/10/12/toss/tips/joint-account>, See pp. 1-9.
Office Action (Non-Final) from corresponding Korean Patent Application No. 10-2018- 0149385, dated Apr. 27, 2020.
Office Action (Final) from corresponding Korean Patent Application No. 10-2018-0149385, dated Oct. 27, 2020.
Notice of Allowance from corresponding Korean Patent Application No. 10-2018-0149385, dated Dec. 17, 2020.
Office Action (Non-Final) from corresponding U.S. Appl. No. 18/048,159, Dated Mar. 27, 2023.
Notice of Allowance from corresponding U.S. Appl. No. 18/048,159, Dated Jun. 22, 2023.
Hwang, Device and Method for Providing Cooperative Shopping Service in Associates With Chatting Application, Oct. 25, 2018.
Oh, Method and Apparatus for Managing Deposit/Withdrawal Details of Group Payment, Jan. 6, 2015.
Kim, Device for Providing Shortcut User Interface and Method Thereof, Nov. 8, 2016.

\* cited by examiner

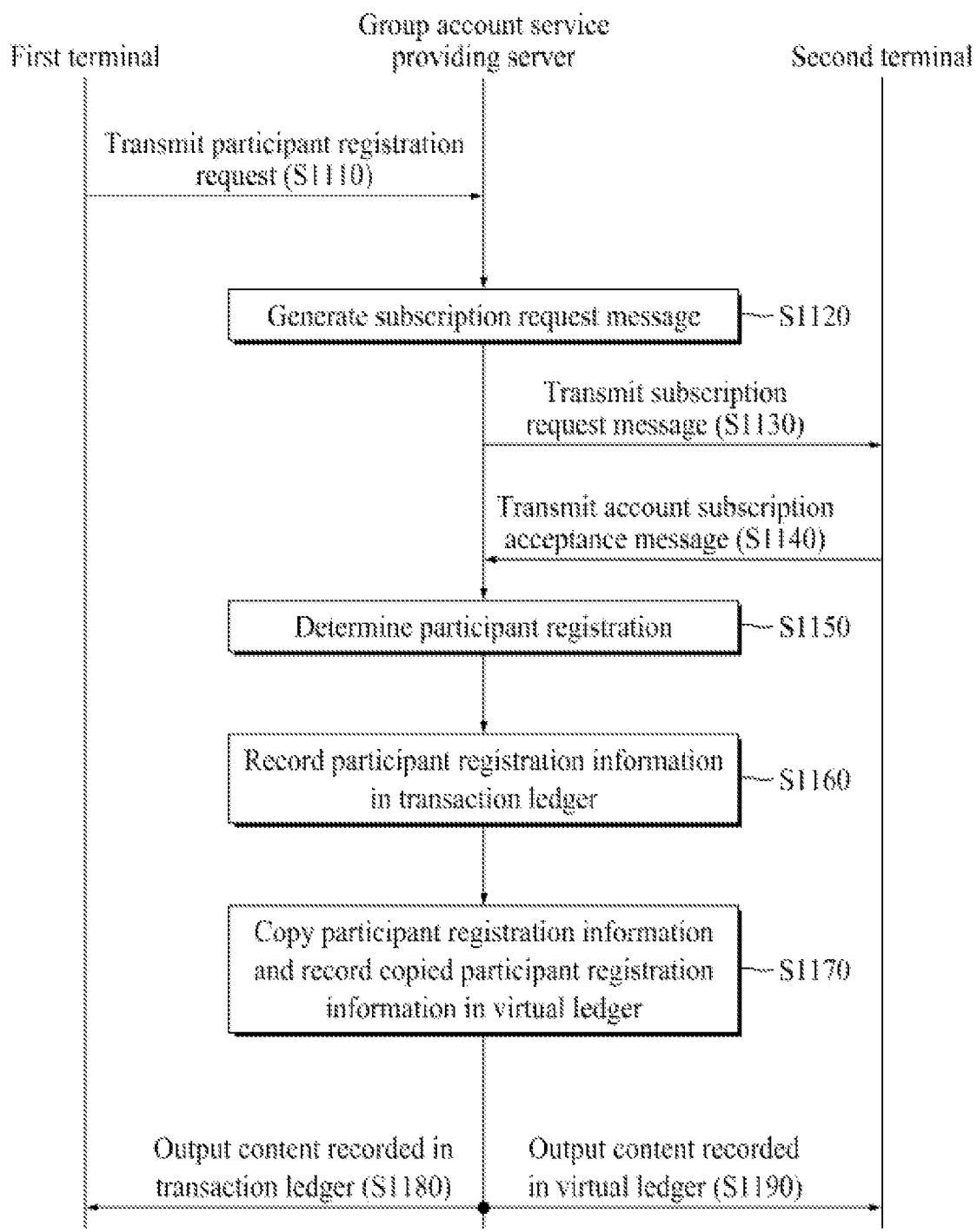

GROUP ACCOUNT SERVICE PROVIDING SERVER AND METHOD

CROSS-REFERENCE TO RELATED APPLICATIONS

This application is a continuation of U.S. patent application Ser. No. 18/048,159, filed on 20 Oct. 2022, which is a national phase application of PCT Application No. PCT/KR2019/016292, filed on 25 Nov. 2019, which claims the benefit and priority to Korean Patent Application No. 10-2018-0149385, filed 28 Nov. 2018. The entire disclosures of the applications identified in this paragraph are incorporated herein by references.

TECHNICAL FIELD

The present invention relates to a banking service, and more specifically, to a mobile banking service.

BACKGROUND ART

Even in the reality of society gradually changing into an individualistic society, modern people have one or two groups through the links of kinship, regional links, and school relations. In order for these groups to be maintained and developed continuously, funds for management of groups are necessarily required.

Generally, in order to manage funds for management of groups, a method of opening a bank account under a name of a group or a real name of a host of the group and managing the funds for management of groups using the opened bank account is used.

However, in the case in which the bank account is opened under the name of the group, there is a problem in that a procedure for opening the bank account is strict and complicated because the bylaws or articles of incorporation of the group are required. In the case in which the bank account is opened under the host's real name, there is a disadvantage in that it is not only inconvenient because the host should visit the bank in person to open an account, and when the host has an account that has already been opened at the corresponding bank, it is also inconvenient because the host is restricted from opening an additional account or can only open a limited account with a limit on the transaction amount.

In addition, when the group is operated using the bank account opened under the host's real name, there is a problem in that inconvenience is increased because participants of the group may not be able to check the transaction history of the bank account opened under the host's real name so that the management of the membership fees may become unclear, and because the transaction history of the bank account opened under the host's real name should be printed out or provided through screen capture in order to share the transaction history of the bank account opened under the host's real name with the participants of the group.

SUMMARY

Technical Problem

Therefore, the present invention is designed to solve the problems and is for providing a group account service providing server in which a private account for a host of a group may be converted into a group account in real time through a terminal of the host.

The present invention is also for providing a group account service providing server in which the contents recorded in a transaction ledger of a group account may be shared between participants of a group and a host of the group through a virtual ledger which is generated by copying the contents recorded in the transaction ledger of the group account.

The present invention is also for providing a group account service providing server in which a participant of a group may be invited to a group account service through a terminal of a host of the group and the participant may be registered as a member for on the group account.

Technical Solution

To solve the above problems, the present invention may include the following configurations.

A group account service providing server includes an account management unit configured to convert a first account into a group account when a group account conversion request for the first account of a host of a group is generated; a transaction ledger management unit configured to record change information in a transaction ledger for the group account when the change information including at least one of a transaction occurrence event and an information occurrence event is generated for the group account; a virtual ledger management unit configured to generate a virtual ledger to be mapped to the transaction ledger when the first account is changed to the group account and copy the change information recorded in the transaction ledger to record the copied change information in the virtual ledger when the change information is recorded in the transaction ledger; and an interface unit configured to display the transaction ledger on a first agent installed in a first terminal of the host and display the virtual ledger on a second agent installed in a second terminal of a participant sharing the group account.

A group account service providing method includes converting a first account into a group account in response to a group account conversion request for the first account of a host of a group; generating a virtual ledger to be mapped to a transaction ledger of the group account; recording change information in the transaction ledger when the change information including at least one of a transaction occurrence event and an information occurrence event is generated for the group account; when the change information is recorded in the transaction ledger, monitoring the transaction ledger and copying and recording the change information in the virtual ledger; and outputting contents recorded in the transaction ledger to a first agent installed in a first terminal of the host and outputting contents recorded in the virtual ledger to a second agent installed in a second terminal of the participant sharing the group account.

Advantageous Effects

According to the present invention, a private account for a host of a group can be changed to a group account in response to a group account conversion request generated through a terminal of the host without visiting the bank so that the group account can be easily opened.

Further, according to the present invention, when a transaction history is recorded in a transaction ledger according to the occurrence of the transaction history in the group account, the transaction history recorded in the transaction ledger is copied and recorded in a virtual ledger, the host can know the contents of the group account through the transaction ledger and a participant of the group can know the contents of the group account through the virtual ledger, and thus not only the host but also the participant can check the transaction history in the group account in real time. Therefore, a membership fee can be used transparently.

Further, the host can share the contents of the group account with the participants by providing the contents of the virtual ledger without any inconvenience, such as printing out the transaction history or capturing a screen to share the transaction history of the group account with the participants, and thus the host can conveniently manage the group account.

Further, according to the present invention, the participant who will participate in the group account can be registered only by selecting a person from a list of the persons obtained from a messenger program installed in the terminal of the host, and thus the participant can be easily managed so that the group can be activated.

BRIEF DESCRIPTION OF THE DRAWINGS

FIG. 11 is a flowchart illustrating a method of performing a participant registration procedure according to an embodiment of the present invention.

DETAILED DESCRIPTION

Figure 1:
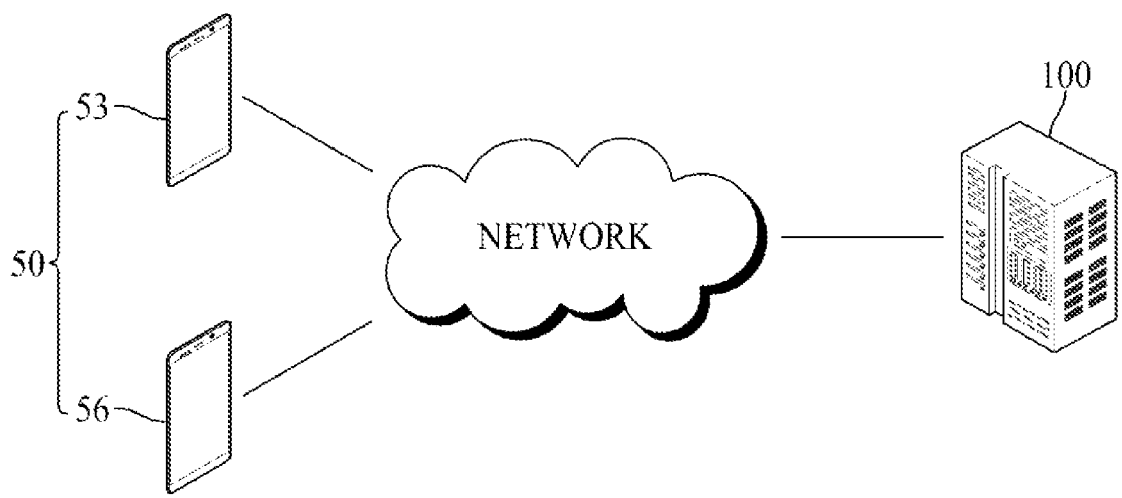
FIG. 1 is a diagram illustrating a group account service providing system according to an embodiment of the present invention.

In this specification, when reference numerals are assigned to components of each drawing, it should be noted that, even when the same components are illustrated in different drawings, the same numerals are assigned to the same components whenever possible.

Meanwhile, the meaning of the terms described in this specification should be understood as follows.

Elements of the invention referred to as singular may number one or more, unless the context clearly indicates otherwise. The terms first, second, etc. are used to distinguish one component from another component, and the scope of the present invention is not limited to these components.

It will be further understood that the terms "comprise," "comprising," "include," and/or "including," do not preclude the presence or addition of one or more other features, numbers, steps, operations, components, parts and/or combinations thereof.

When the term "at least one" is used, it should be understood to include all possible combinations of one or more of the associated listed items. For example, "at least one of a first item, a second item, and a third item" means each of the first item, the second item, and the third item, and means a combination of all items that may be presented from two or more of the first item, the second item, and the third item.

Hereinafter, embodiments of the present invention will be described with reference to the accompanying drawings.

FIG. 1 is a diagram illustrating a group account service providing system according to an embodiment of the present invention. As illustrated in FIG. 1, a group account service providing system 10 according to the embodiment of the present invention includes user terminals 50 and a group account service providing server 100.

The user terminals 50 communicate with the group account service providing server 100 through a network to provide a group account service to users. To this end, a banking agent (hereinafter, referred to as an "agent") is installed in the user terminal 50. The agent receives a banking request from the user and transmits the banking request to the group account service providing server 100 to allow the banking request received from the user to be processed by the group account service providing server 100.

For example, when receiving an account opening request or a transfer request from the user, the agent transmits the received account opening request or the transfer request to the group account service providing server 100 to allow the group account service providing server 100 to open an account or transfer an amount requested to be transferred.

In an embodiment, when a group account related request including a group account conversion request or a participant registration request is received from a host who establishes a group, a first agent installed in a first terminal 53 of the host may provide the group account related request to the group account service providing server 100 to allow the group account service providing server 100 to provide a group account service.

Meanwhile, a second agent installed in a second terminal 56 of a participant who wants to participate in the group joins in the group account service in response to the participant registration request transmitted from the first agent, and thus the group account service is provided to the participant through the second agent. In FIG. 1, although the second terminal is illustrated as a single terminal, this is only exemplary, and a plurality of second terminals may be provided. The participant may share a transaction history of the group account with the host in real time through the second agent.

The group account service providing server 100 provides the group account service to the host through the first agent and to the participant through the second agent. Hereinafter, the group account service providing server 100 will be described in detail with reference to FIG. 2.

Figure 2:
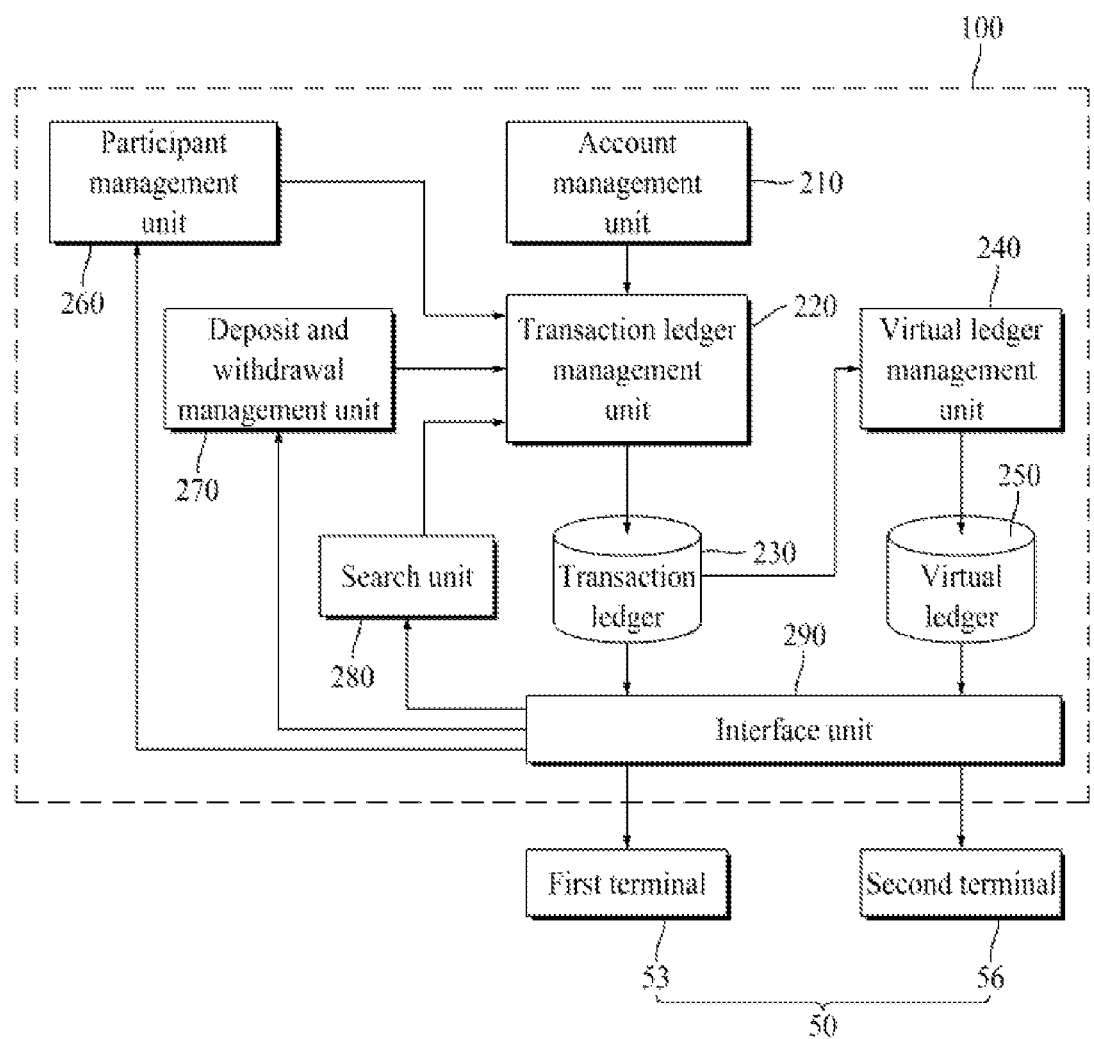
FIG. 2 is a block diagram illustrating a configuration of a group account service providing server according to an embodiment of the present invention.

FIG. 2 is a block diagram illustrating a configuration of the group account service providing server 100 according to the embodiment of the present invention. As illustrated in FIG. 2, the group account service providing server 100 includes an account management unit 210, a transaction ledger management unit 220, a transaction ledger 230, a virtual ledger management unit 240, a virtual ledger 250, a participant management unit 260, a deposit and withdrawal management unit 270, a search unit 280, and an interface unit 290.

When receiving a group account conversion request from the first agent, the account management unit 210 converts a first account previously held by the host into a group account. In an embodiment, the group account conversion request may include information about the first account which is a subject to be converted, setting information for group account to be generated, and additional information for the group account.

In this case, the group account conversion request may be generated by the first agent installed in the first terminal 53. Hereinafter, the process in which the group account conversion request is generated by the first agent will be described in detail with reference to FIGS. 3A to 3C.

Figure 3A:
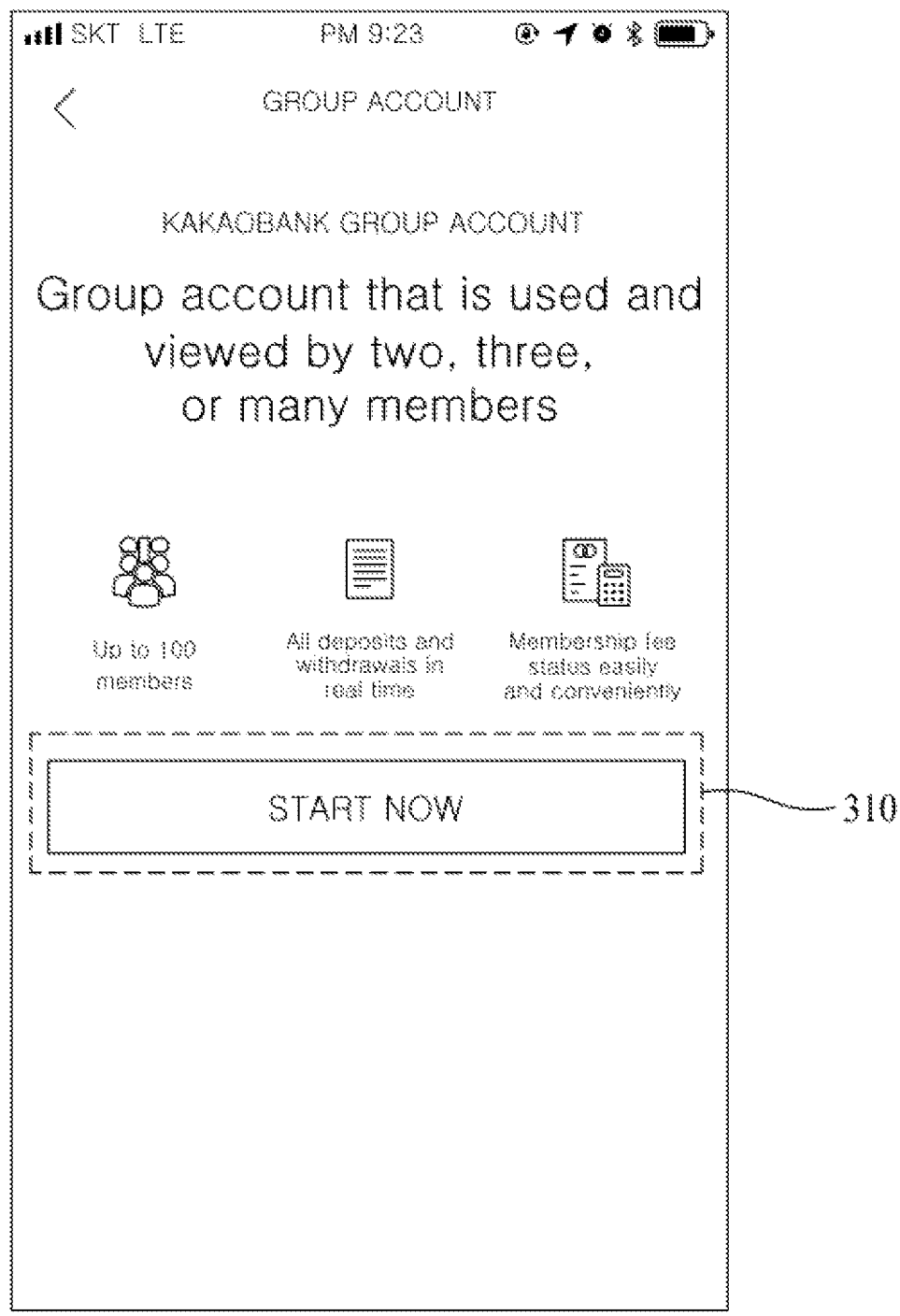
FIGS. 3A, 3B, 3C and 3D are views illustrating examples of a group account conversion page displayed through an agent according to an embodiment of the present invention.
Figure 3B:
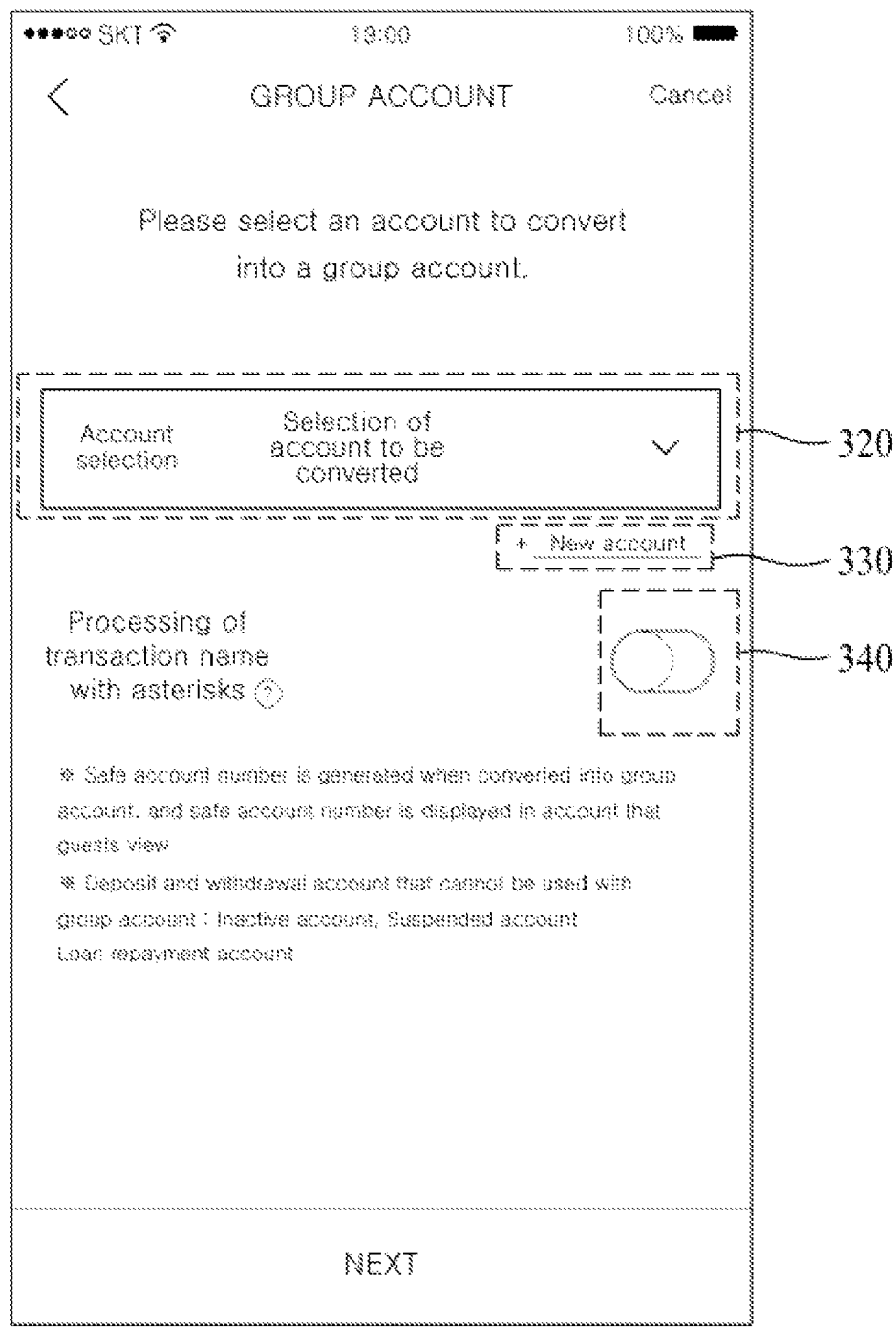
Figure 3C:
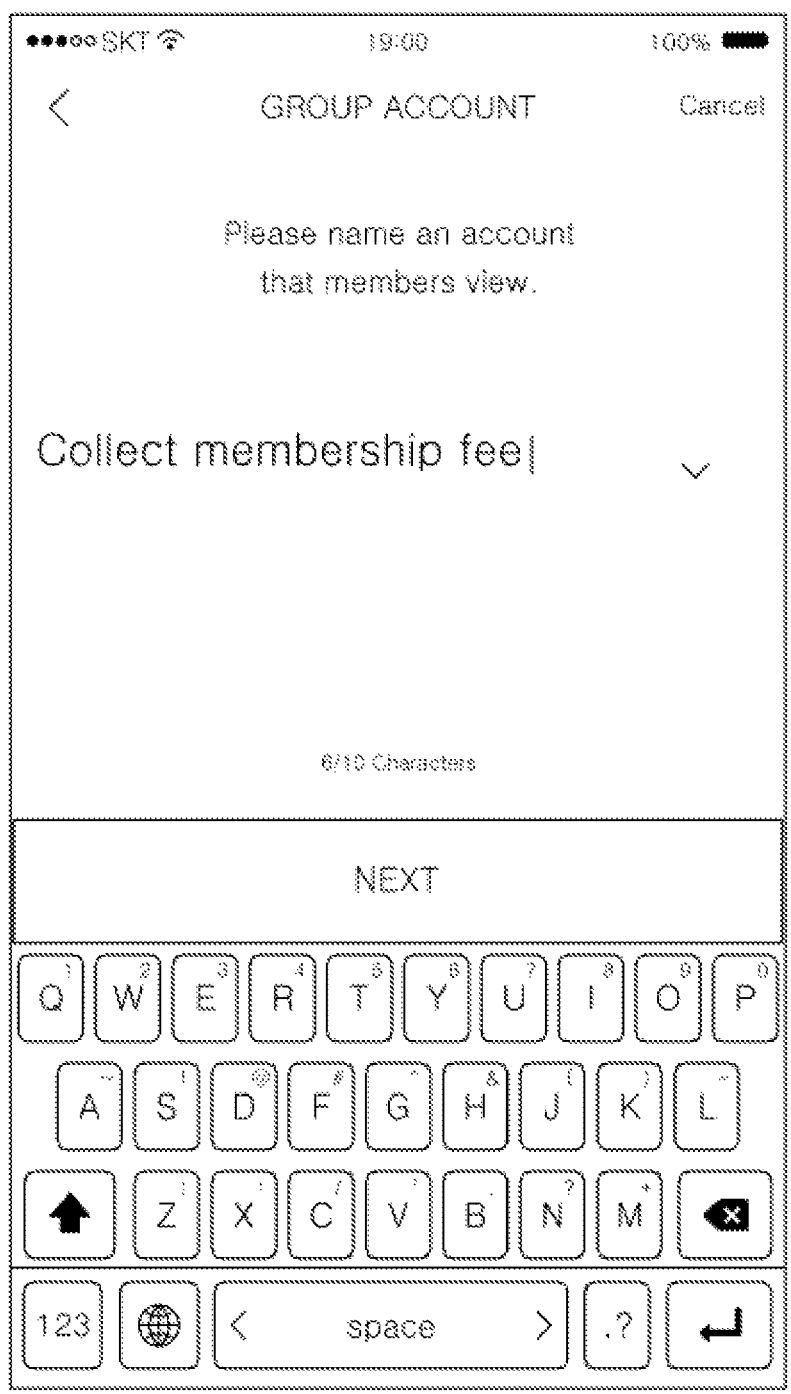
Figure 3D:

FIG. 3A is a view illustrating a group account opening request page, FIG. 3B is a view illustrating an account conversion request page, and FIGS. 3C and 3D are views illustrating a group account setting information input page.

When the host executes the first agent through the first terminal 53, an intro page for providing the banking service may be provided through the first agent, and when the host requests to open the group account through various routes provided on the intro page, the group account opening request page as illustrated in FIG. 3A may be provided through the first agent. For example, when the host selects a menu "recommended" on the intro page, a page including a sub menu "group account" may be provided through the first agent, and when the host selects the sub menu "group account," the group account opening request page as illustrated in FIG. 3A may be provided through the first agent.

When a start now button 310 on the group account opening request page illustrated in FIG. 3A is selected by the host, the account conversion request page as illustrated in FIG. 3B is provided through the first agent.

The first agent receives information about the first account to be converted into the group account from the host through an account selection menu 320 on the account conversion request page. In an embodiment, the first account may be a general account opened under a real name of the host. For example, the first account may be a deposit and withdrawal account opened under the real name of the host. In this case, the deposit and withdrawal account may be not only a normal account but also a limited account with a limit on the transaction amount.

Further, when a new account button 330 is selected by the host who does not have any account, pages related to an account opening process for opening a new account may be sequentially provided through the first agent, thereby guiding the new account opening.

Further, when a button 340 for processing the transaction name with asterisks is selected by the host, the account management unit 210 may receive a masking processing request and set masking processing for the group account. In this case, information about the masking processing may be included in the additional information for the group account.

When the account is selected or the account opening is completed, the group account setting information input pages as illustrated in FIGS. 3C and 3D are provided through the first agent. The host may input the setting information for the group account including a name of the group, a category of the group, and the like through the group account setting information input pages. In FIGS. 3C and 3D, although the name of the group and the category of the group are illustrated as being input through the group account setting information input pages, this is only exemplary, and additional information including a membership fee, a membership fee payment date, and the like may be input through the group account setting information input pages.

When the group account conversion request is generated through the process illustrated in FIGS. 3A to 3D, the first agent transmits the generated group account conversion request to the account management unit 210.

Meanwhile, the pages as illustrated in FIGS. 3A to 3D may be provided to the first agent through the interface unit 290 to be described below.

Referring to FIG. 2 again, when the account management unit 210 receives the group account conversion request from the first agent, the account management unit 210 may convert the first account, which is a subject to be converted into the group account, into the group account, notify the transaction ledger management unit 220 of the conversion to allow the transaction ledger management unit 220 to record information that the first account is changed to the group account, and the setting information and the additional information, which are included in the group account conversion request, in the transaction ledger 230 for the group account.

In an embodiment, when the account management unit 210 converts the first account into the group account, the account management unit 210 may assign a safe account number different from a real account number of the first account to the group account. In the present invention, the reason for assigning the safe account number different from the real account number of the first account to the group account is because, according to the present invention, the first account opened under the real name of the host is converted into the group account and the group account is shared with the participant so that the real account number of the first account may be revealed to the participant and personal information of the host may be leaked to the outside.

Figure 4A:
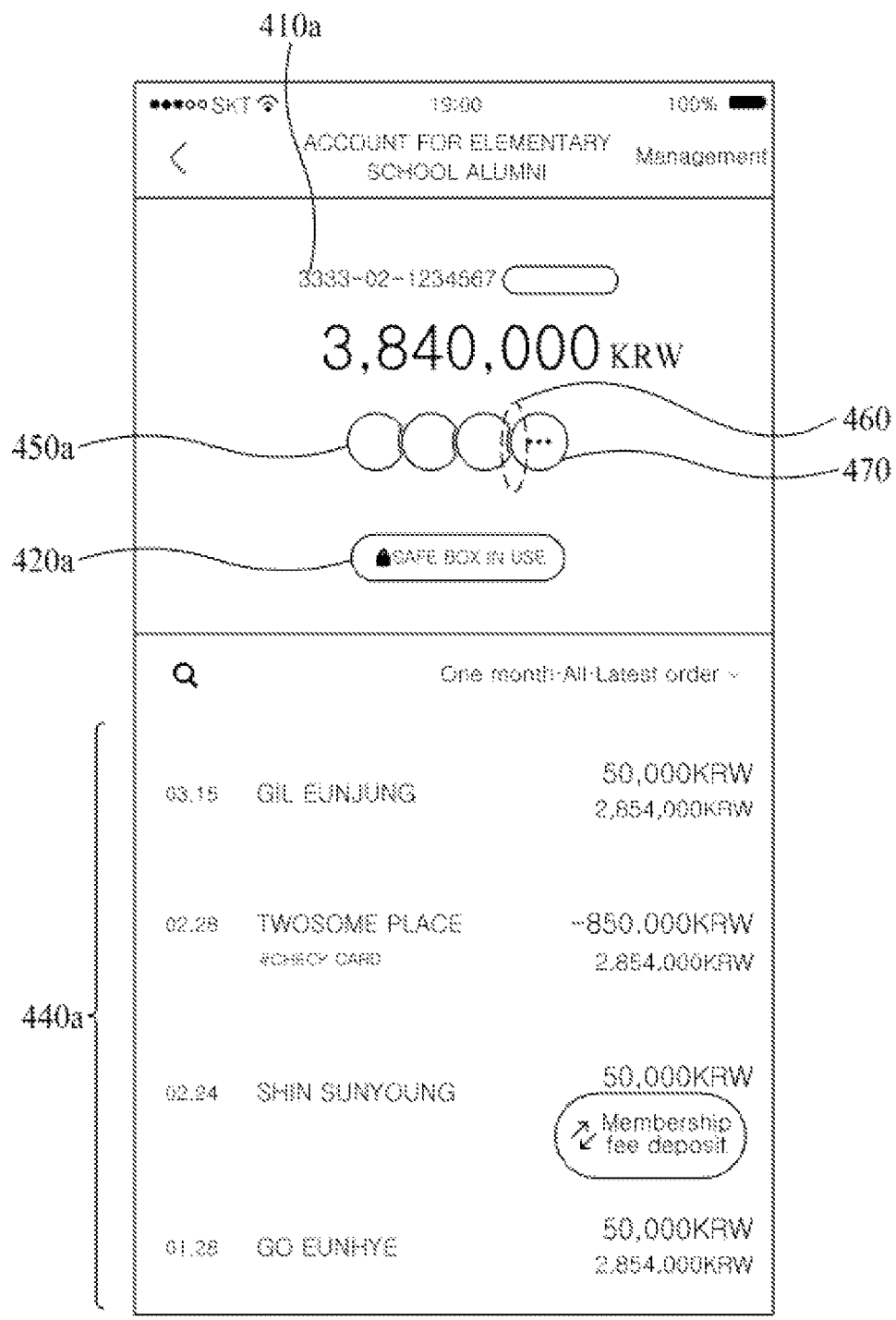
FIGS. 4A and 4B are views illustrating examples of a transaction history page output on a first agent and a second agent according to an embodiment of the present invention.
Figure 4B:
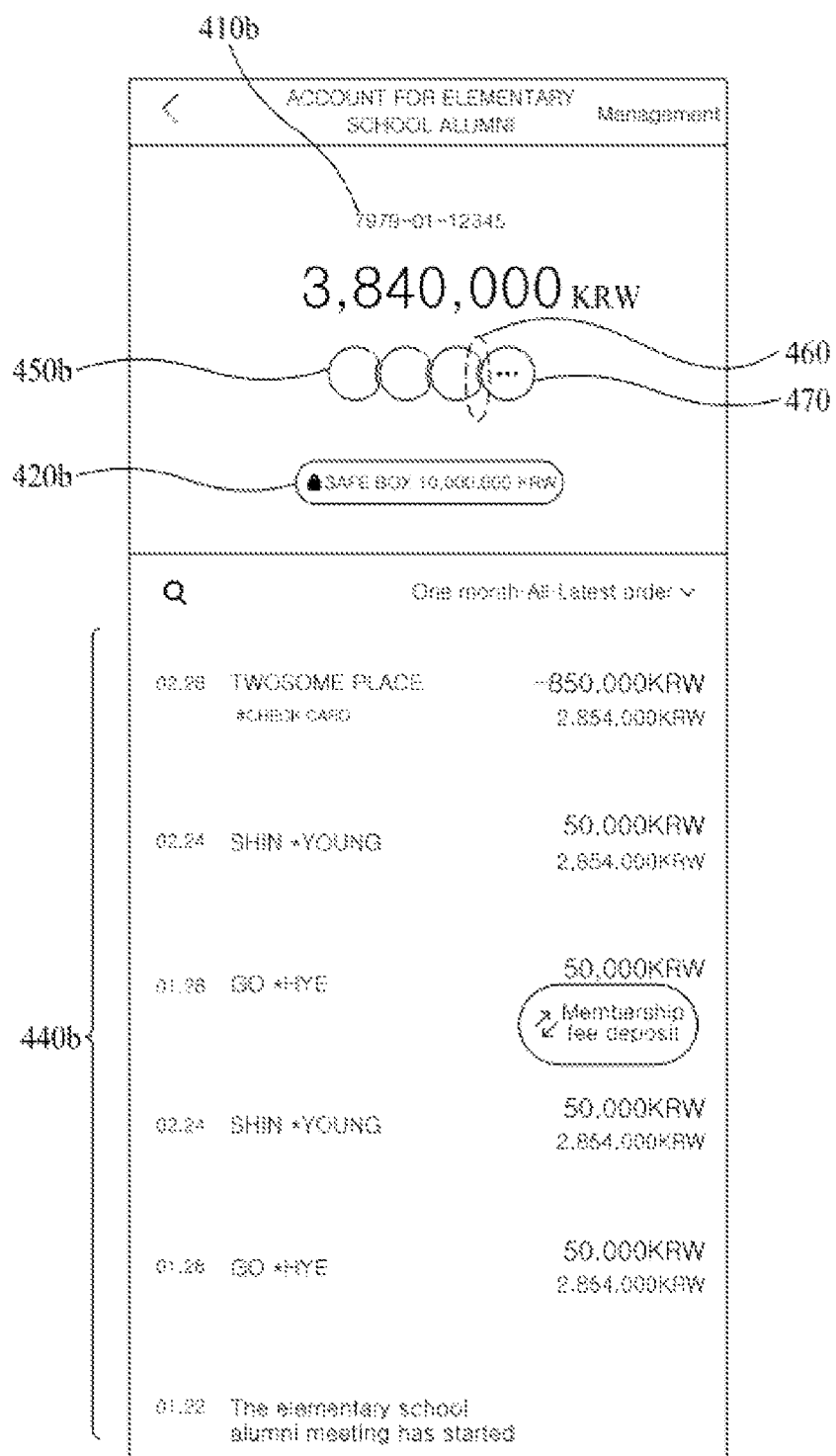

According to the embodiment, a real account number 410a of the first account may be provided to the host on the first agent as illustrated in FIG. 4A, and a safe account number 410b may be revealed to the participant on the second agent as illustrated in FIG. 4B.

However, in another embodiment, the safe account number may be revealed to both of the host and the participant through the first and second agents, or both of the real account number of the first account and the safe account number may be provided to the host on the first agent and the safe account number may be provided to the participant on the second agent.

When the account management unit 210 assigns the safe account number to the group account, the account management unit 210 may notify the transaction ledger management unit 220 of the assigned safe account number so that the transaction ledger management unit 220 may map the safe account number with the real account number of the first account and record.

Meanwhile, when the account management unit 210 according to the present invention receives a group account dividing request for the group account for which the conversion into the group account is completed from the host through the first agent, the account management unit 210 may generate a child account whose parent account is the group account. Specifically, when the account management unit 210 receives the group account dividing request from the first agent, the account management unit 210 opens the child account whose parent account is the group account and which has at least some deposit amount of the parent account as a deposit amount thereof. Accordingly, the host may more conveniently manage reserve funds for the group as compared to the case of managing reserve funds for the group by opening a separate account.

In an embodiment, the account management unit 210 may allow the deposit amount of the child account to be set within a predetermined maximum amount among the deposit amount of the parent account and may assign the first interest rate to the deposit amount of the parent account and assign the second interest rate different from the first interest rate to the deposit amount of the child account. In this case, the second interest rate may be set to be higher than the first interest rate. As described above, in the embodiment of the present invention, the account management unit 210 may assign an interest rate higher than that of the deposit amount of the parent account to the deposit amount of the child account, thereby guiding the host to open the child account and operate the reserve funds for the group.

According to the embodiment, the account management unit 210 may generate a plurality of child accounts for one parent account in response to the request of the user. In this case, the account management unit 210 separates and manages the deposit amount of the parent account and the deposit amount of each of the plurality of child accounts, respectively.

When the account management unit 210 generates at least one child account whose parent account is the group account, the account management unit 210 may notify the transaction ledger management unit 220 of the generation of the child account to allow the transaction ledger management unit 220 to record information on whether the child account is generated for the group account and record information about the deposit amount of the group account and the child account in the transaction ledger.

When the generation of the child account whose parent account is the group account is completed in response to the group account dividing request, menus 420a and 420b indicating whether the child account is generated may be output through the first and second agents as illustrated in FIGS. 4A and 4B. In this case, the menus 420a and 420b indicating whether the child account is generated may include the deposit amount of the child account.

Referring to FIG. 2 again, when the first account is converted into the group account by the account management unit 210, the transaction ledger management unit 220 records the content of an event in the transaction ledger for the group account when the event occurs for the group account. In an embodiment, the transaction ledger for the first account may be used as the transaction ledger for the group account as it is or the transaction ledger for the group account may be newly generated.

In an embodiment, the event for the group account may include at least one of a transaction occurrence event and an information occurrence event. The transaction occurrence event may be a deposit event or a withdrawal event for the group account. When the transaction occurrence event such as the deposit event or the withdrawal event occurs for the group account, the transaction ledger management unit 220 may record the content of the event, which includes a transaction date and time, an abstract, a transaction amount, and a balance, in the transaction ledger 230.

The information occurrence event may include at least one of memo related to deposit or withdrawal, a tag, registration or withdrawal information of the participant, an announcement related to the group, a Dutch treat payment request, the setting information for the group account, and the additional information for the group account. Here, the tag is for distinguishing a representative transaction and, for example, when payment is made using a check card, a symbol "#check card" may be displayed. The setting information may include a name of the group, a category of the group, information about a messenger profile, a membership fee, and a membership fee payment date. The additional information may include information about masking processing, information on whether the child account is generated, information about the child account, and information about the safe account number.

Meanwhile, when the transaction ledger management unit 220 receives a Dutch treat payment request from the first agent by the host, the transaction ledger management unit 220 records the Dutch treat payment request in the transaction ledger 230. The Dutch treat payment request includes an amount spent, the number of the members including the host and the participants to share the amount spent, and an amount shared by each member. For example, when the amount spent and the number of members to share the amount spent are input by the host through a menu (not illustrated) that is output when a Dutch treat payment request icon (not illustrated) is selected by the host through the first agent, the amount shared by each member may be automatically calculated so that the Dutch treat payment request may be generated.

The content recorded in the transaction ledger 230 by the transaction ledger management unit 220 is output on the first agent by the interface unit 290.

The transaction occurrence event and the information occurrence event are recorded in the transaction ledger 230 by the transaction ledger management unit 220. Here, the transaction ledger 230 may be implemented in the form of a database.

When the first account is converted into the group account by the account management unit 210, the virtual ledger management unit 240 generates the virtual ledger 250 for the group account, copies the content recorded in the transaction ledger 230, and records the copied content in the virtual ledger 250.

In the present invention, the reason for generating the virtual ledger through the virtual ledger management unit 240 is because the host may directly assess the transaction ledger 230 but the participant may not directly assess the transaction ledger for the group account, which is an account of another person, and the virtual ledger in which the content recorded in the transaction ledger 230 is copied and recorded may be generated so that the participant may read the virtual ledger, and thus the participant may feel substantially the same as when reading the transaction ledger.

The virtual ledger management unit 240 may monitor change information of the transaction ledger 230 in real time, and when it is determined that a change occurs in the transaction ledger 230, the virtual ledger management unit 240 records the change information occurred in the transaction ledger 230 in the virtual ledger 250. Specifically, as a result of the monitoring of the transaction ledger 230, when a transaction occurrence event is newly recorded in the transaction ledger 230, the virtual ledger management unit 240 copies the newly recorded transaction occurrence event to record the newly recorded transaction occurrence event in the virtual ledger 250. Further, when, as a result of the monitoring of the transaction ledger 230, an information occurrence event is newly recorded in the transaction ledger 230, the virtual ledger management unit 240 copies the newly generated information occurrence event to record the newly generated information occurrence event in the virtual ledger 250.

The content recorded in the virtual ledger 250 by the virtual ledger management unit 240 is output on the second agent by the interface unit 290.

Meanwhile, when the transaction ledger management unit 220 uses the transaction ledger for the first account as the transaction ledger 230 for the group account as it is, the virtual ledger management unit 240 may copy and record the transaction occurrence events and the information occurrence events that occurred after the time when the first account is converted into the group account. Accordingly, since the participants may check only the transaction occurrence event and the information occurrence event that occurred after the time when the first account is converted into the group account, it is possible to prevent the pieces of information generated during the period when the group account is used privately by the host from being shared with the participants and prevent the personal information of the host from leaking.

In the virtual ledger 250, the transaction occurrence events and the information occurrence events which are recorded in the transaction ledger 230 are recorded by the virtual ledger management unit 240. Here, the virtual ledger 250 may be implemented in the form of a database.

As described above, according to the present invention, when the transaction history is recorded in the transaction ledger according to the occurrence of the transaction history of the group account, the virtual ledger management unit may copy the transaction history recorded in the transaction ledger and record the copied transaction history in the virtual ledger so that the content recorded in the virtual ledger may be provided to the participants and not only the host but also the participants may check the transaction history in the group account in real time.

The participant management unit 260 registers at least one person selected by the host among the persons registered in a first messenger agent as the participant. To this end, the first agent obtains a list of the persons registered in the first messenger agent by communicating with the first messenger agent and provides the obtained list of the persons to the host through the first agent.

The participant management unit 260 may generate a participant registration request for registering a target person as the participant by selecting at least one person among the list of the persons output through the first agent by the host.

Figure 5A:
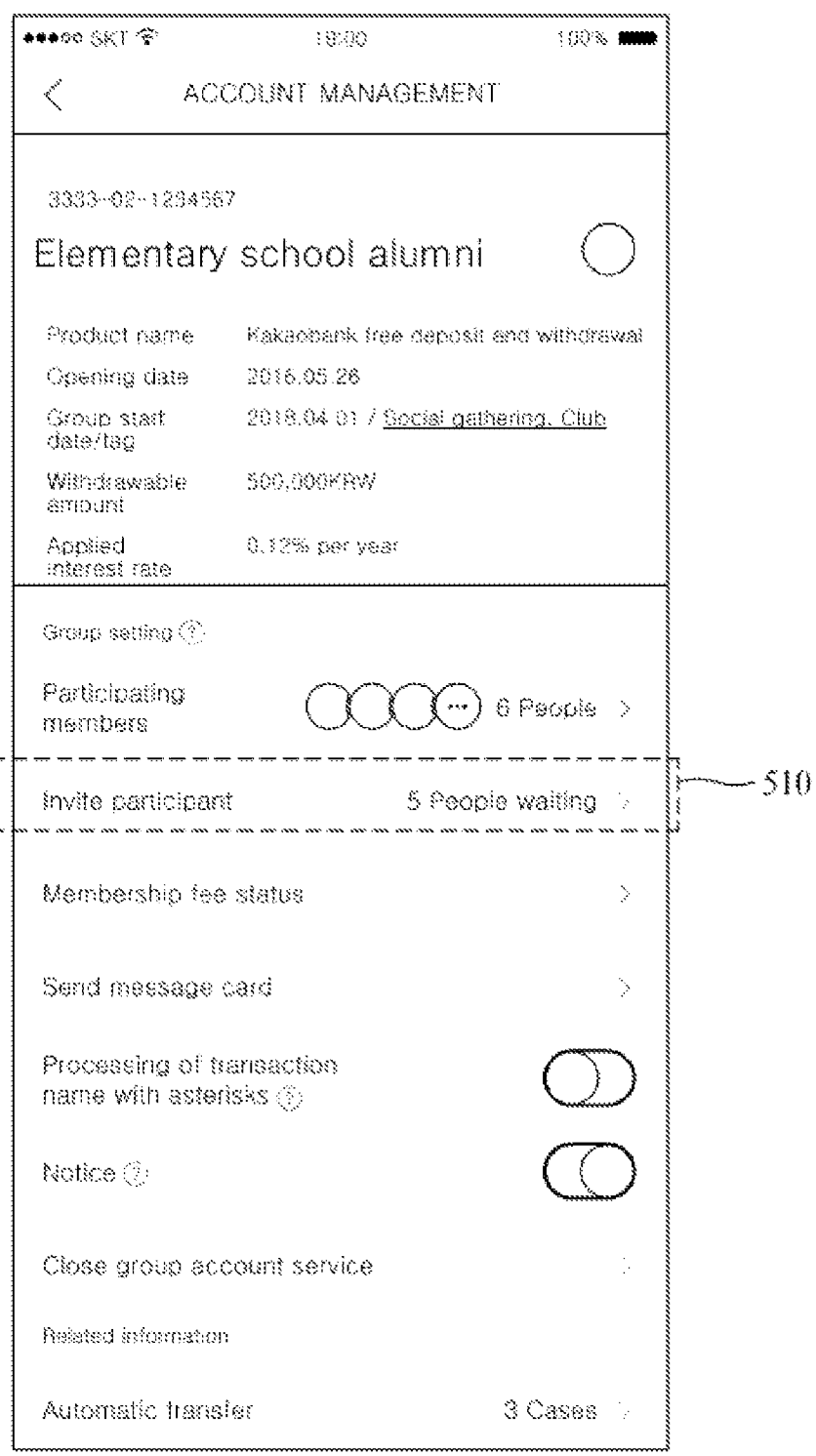
FIGS. 5A, 5B and 5C are views illustrating examples of a member registration request page output on a first agent according to an embodiment of the present invention.
Figure 5B:
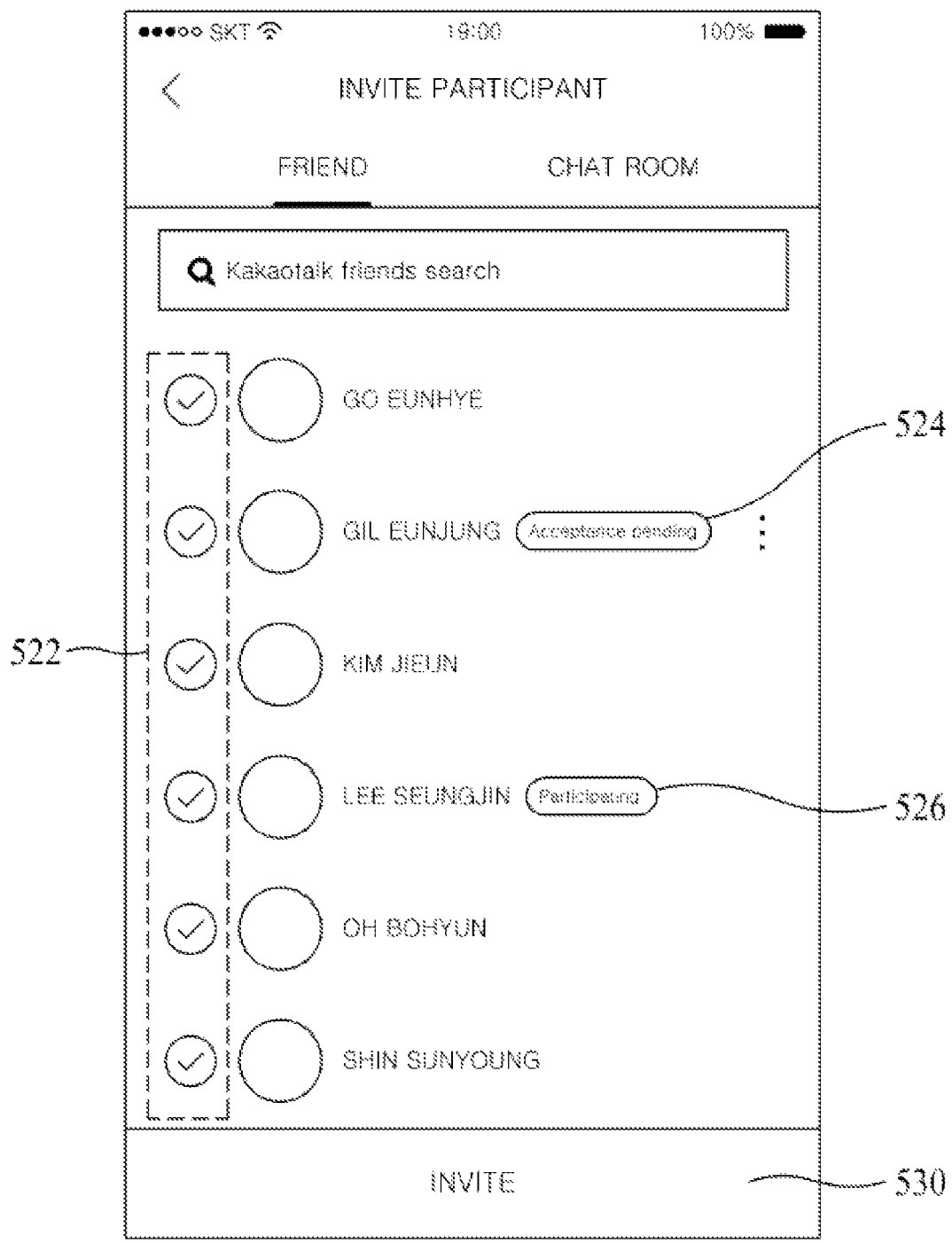
Figure 5C:
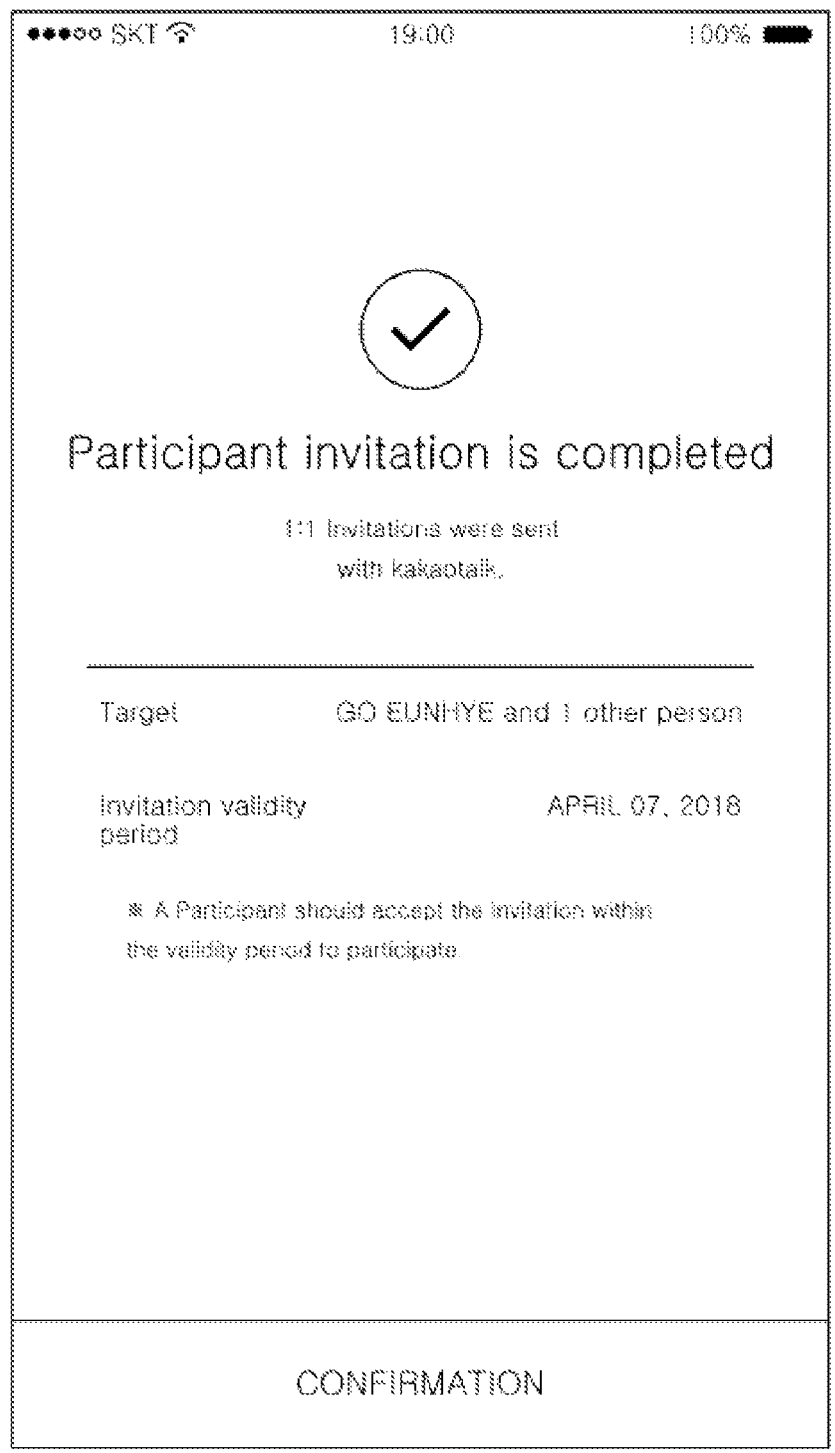

For example, as illustrated in FIGS. 5A to 5C, when the host executes the first agent through the first terminal, the intro page for providing the banking service may be provided on the first agent, and when the host requests to register the participant through various routes provided on the intro page, a participant invitation page may be provided on the first agent as illustrated in FIG. 5A.

As illustrated in FIG. 5A, a participant invitation icon 510 is output on the first agent by the interface unit 290. When the host selects the participant invitation icon 510, a participant selection page in which the persons registered in the first messenger agent are displayed on the first agent as illustrated in FIG. 5B is displayed.

Further, unlike that illustrated in FIG. 5A, it is possible to provide the participant selection page as illustrated in FIG. 5B even through a page having a "participant invitation" icon. The page may be provided through the first agent after the host generates the group account conversion request.

In this case, as illustrated in FIG. 5B, check icons 522 are output on the first agent by the interface unit 290 so that the host may select the persons to be invite as the participants. In this case, the check icon 522 for an uninvited person may be output in an activated status so that selection is possible, but the check icon 522 for a person who is already invited as the participant but is waiting to be accepted or for a previously registered person as the participant may be output in a deactivated status so that selection is not possible. Further, in order to distinguish the person is waiting to be accepted from the previously registered person, an acceptance pending icon 524 may be output for the persons who is already invited but is waiting to be accepted, and a participating icon 526 may be output for the previously registered person as the participant.

When the host selects at least one of the check icons 522 for the persons registered in the first messenger agent and selects an invitation icon 530, a participant invitation completion page is displayed on the first agent as illustrated in FIG. 5C. In this case, the participant management unit 260 receives the participant registration request from the first agent, generates a group account subscription request message, and transmits the generated group account subscription request message to the second agent and a second messenger agent.

When the participant management unit 260 receives the participant registration request from the first agent, the participant management unit 260 generates the group account subscription request message for registering the target person to the group account and transmits the generated group account subscription request message to the second messenger agent installed in the second terminal 56 of the target person.

Figure 5D:
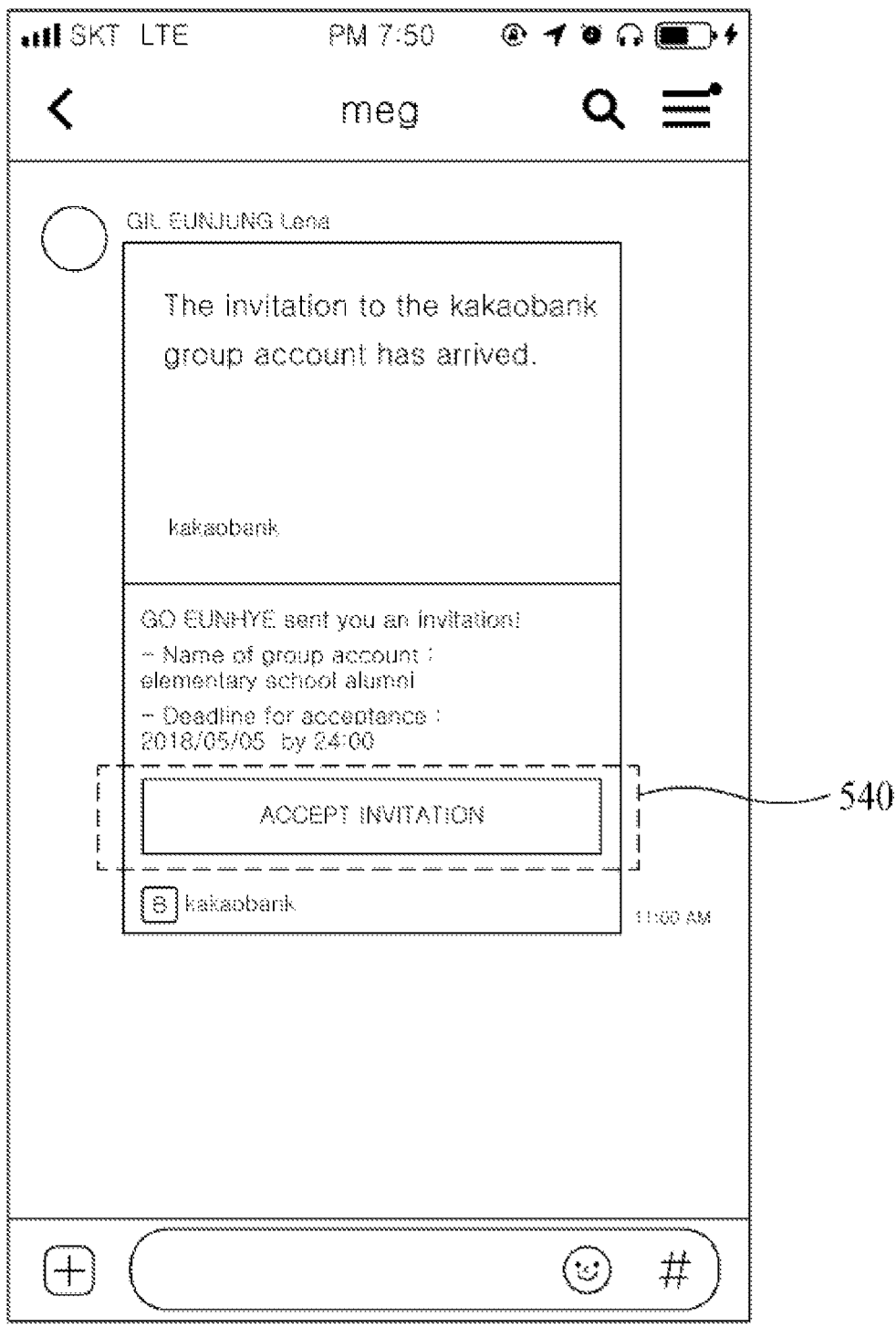
FIG. 5D is a view illustrating an example of a subscription request message output on a second messenger agent according to an embodiment of the present invention.
Figure 5E:
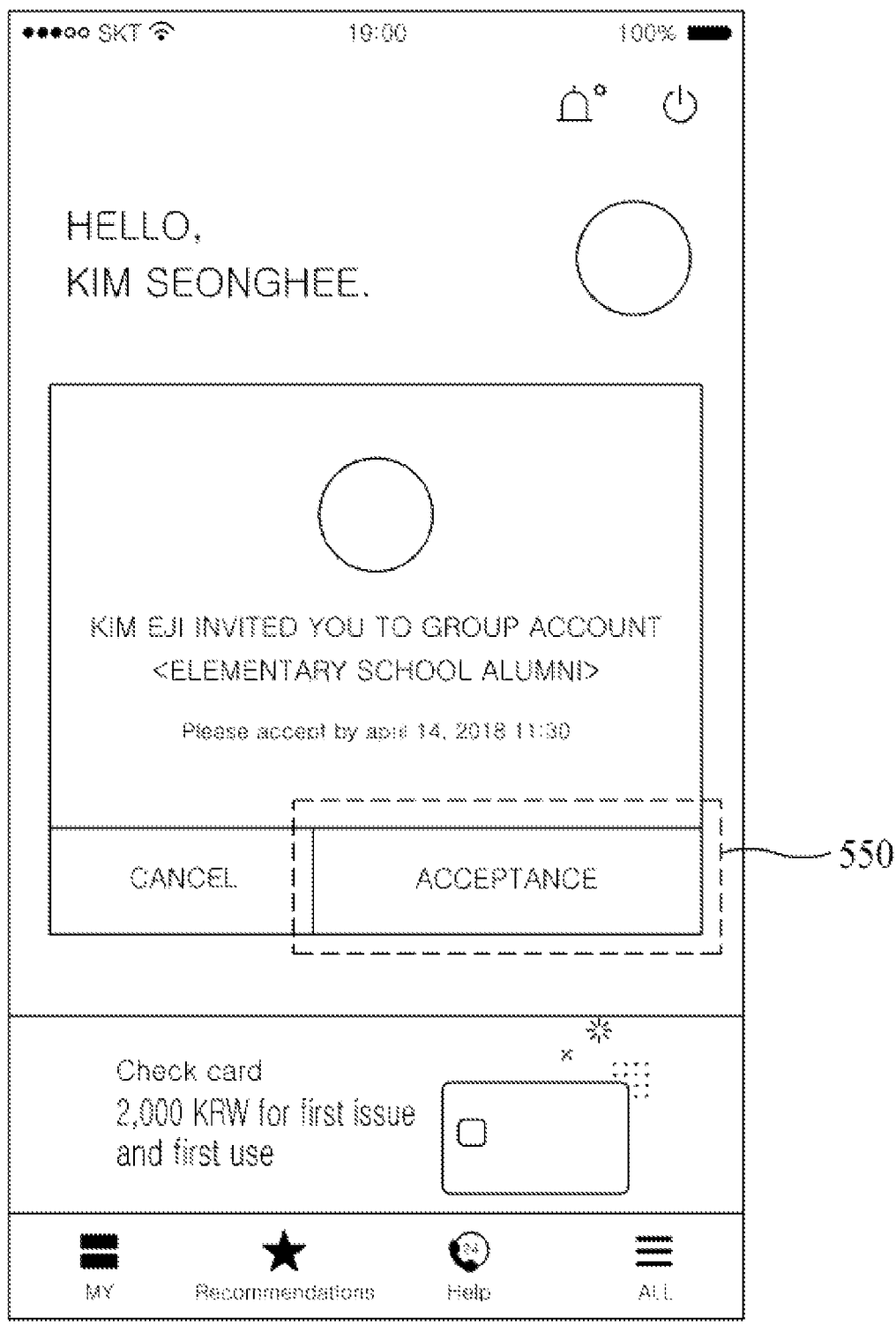
FIG. 5E is a view illustrating an example of a group account participation request page output on a second agent according to an embodiment of the present invention.

For example, as illustrated in FIG. 5D, when the participant management unit 260 transmits the group account subscription request message to the person to be registered as the participant through the second messenger agent and the person to be registered as the participant selects an invitation acceptance icon 540 on the second messenger agent, the second agent is executed and the group account participation request page is output on the second agent as illustrated in FIG. 5E.

Unlike that illustrated in FIG. 5D, the person to be registered as the participant executes the second agent and selects the group account subscription request message provided on the second agent so that the group account participation request page may be output as illustrated in FIG. 5E.

When receiving an account subscription acceptance message from the second agent installed in the second terminal 56, the participant management unit 260 registers the target person as the participant for the group account. In this case, when the group account subscription request message output on the second messenger agent is selected by the target person and the second agent is run, and when the account subscription is accepted by the target person through the second agent, the account subscription acceptance message is generated.

For example, as illustrated in FIG. 5E, when the target person to be registered as the participant selects acceptance icon 550, the participant management unit 260 receives the account subscription acceptance message from the second agent while a message indicating that the group account invitation is accepted is displayed on the second agent, and the participant management unit 260 registers the target person who accepts the account subscription as the participant.

In the above-described embodiment, the participant management unit 260 is described as transmitting the group account subscription request to the second messenger agent of the target person. However, in a modified embodiment, the participant management unit 260 may directly transmit the group account subscription request to the second agent of the target person. In this case, the account subscription acceptance message may be generated when the account subscription is accepted by the target person after the group account subscription request message output on the second agent is selected by the target person.

When the participant management unit 260 registers the participant, the participant management unit 260 may notify the transaction ledger management unit 220 of the registration of the participant so that the information about the registered participant may be recorded in the transaction ledger 230 by the transaction ledger management unit 220.

In an embodiment, the participant management unit 260 may collectively register all the corresponding persons for the participant registration request for all persons registered in a chat room opened on the first messenger agent as the participants.

Specifically, when receiving the participant registration request for all the persons registered in the chat room opened on the first messenger agent from the first agent, the participant management unit 260 transmits the group account subscription request message to the second messenger agents installed in the second terminals of the target persons included in the participant registration request. When the target persons select the group account subscription request message to perform the account subscription acceptance through the second agents, the participant management unit 260 may register the corresponding target persons as the participants. In this case, each of the target persons may select the group account subscription request message transmitted to the second agent to perform the account subscription acceptance or may select the group account subscription request message transmitted to the second messenger agent and execute the second agent to perform the account subscription acceptance.

Meanwhile, the participant management unit 260 may receive information about a messenger profile of the host and information about a messenger profile of the participant through first agent and record them in the transaction ledger 230. The information about the messenger profile of the host and the information about the messenger profile of the participant may be obtained from the first messenger agent. In an embodiment, the information about the messenger profile of the host and the information about the messenger profile of the participant may be obtained from the first messenger agent by the first agent in communication with the first messenger agent and be transmitted to the participant management unit 260, and the participant management unit 260 may transmit the information about the messenger profile of the host and the information about the messenger profile of the participant to the transaction ledger management unit 220, and thus the transaction ledger management unit 220 may record the information about the messenger profile of the host and the information about the messenger profile of the participant in the transaction ledger 230.

In this case, the first messenger agent may refer to a social networking service (SNS) application or short message service (SMS) application, through which messages are transmitted, and the information about the messenger profile may include the name of the host or the name of the participant and a profile picture of the host or a profile picture of the participant.

In the above-described embodiment, the participant management unit 260 is described as performing a function of registering the participant who will participate in the group account service. In another embodiment, the participant management unit 260 may additionally perform a function of exiting the registered participant. Specifically, when receiving a participant exit request from the second agent, the participant management unit 260 allows a target participant who is the target of the exit request to from the group account. The participant management unit 260 may transmit the information about the target participant who requests to exit to the transaction ledger management unit 220 to allow the transaction ledger management unit 220 to record the withdrawal information about the corresponding participant.

Figure 6A:
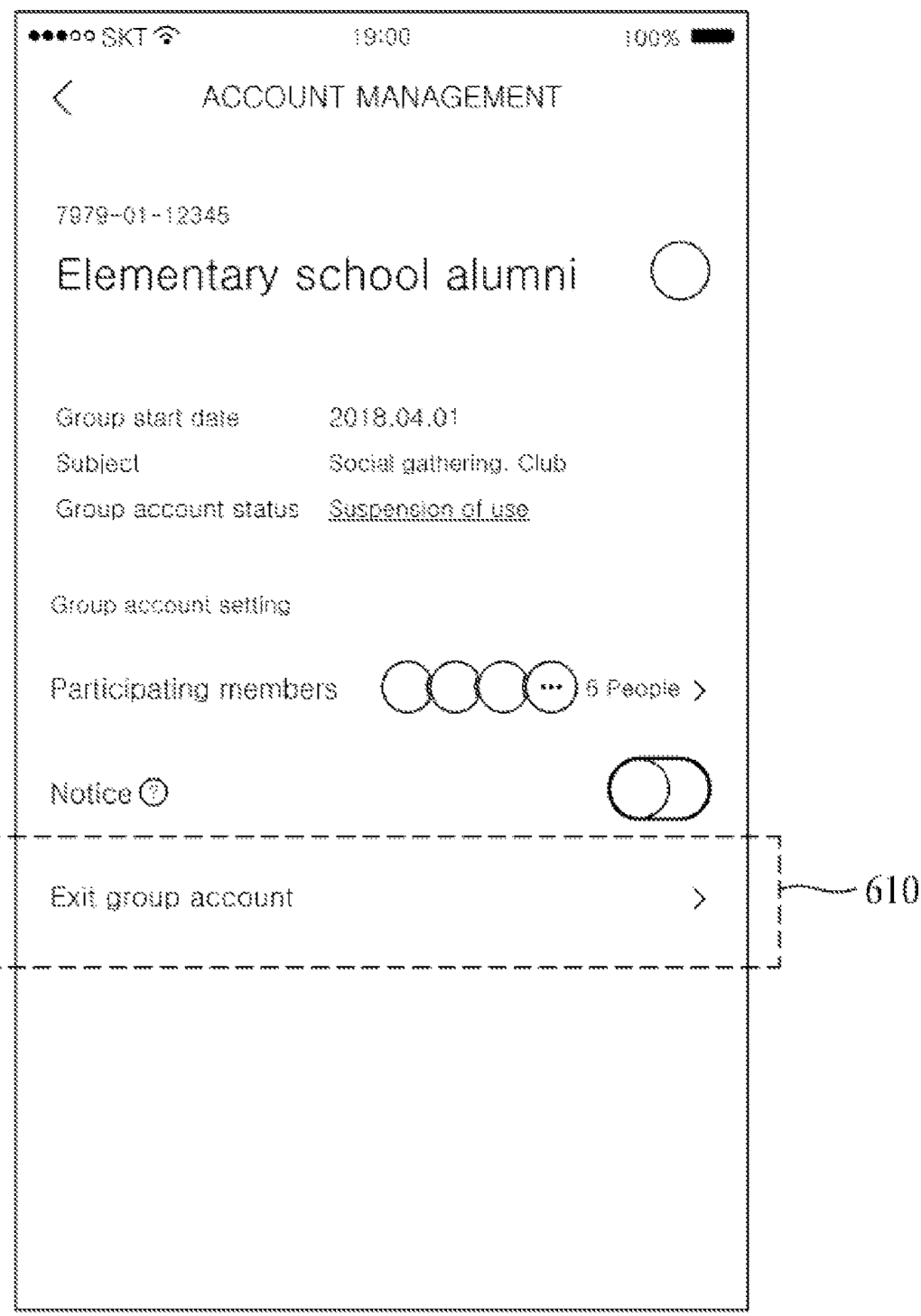
FIG. 6A is a view illustrating an example of a group account exit page output on a second agent for a member to exit according to an embodiment of the present invention.
Figure 6B:
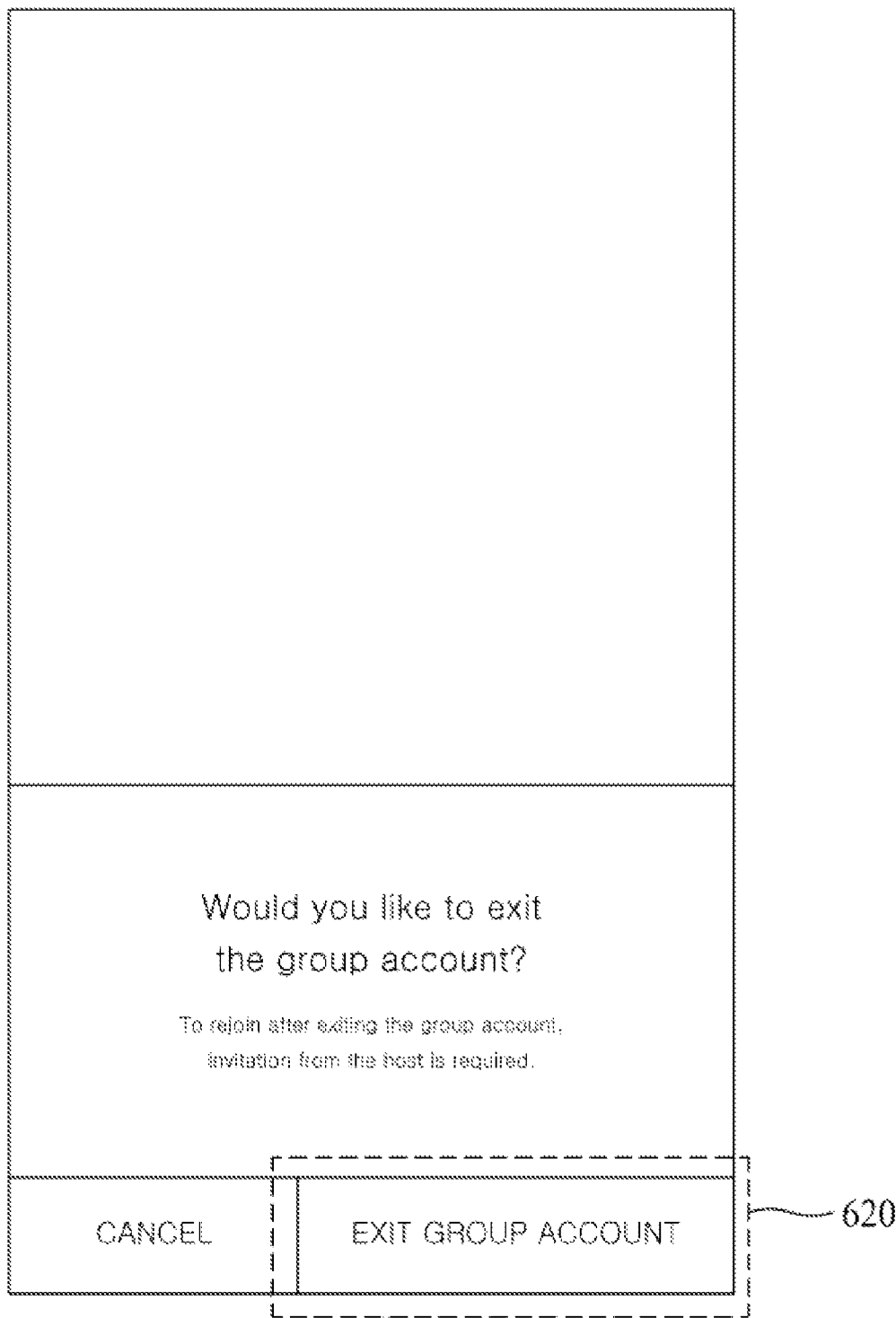
FIG. 6B is a view illustrating an example of a member exit request page according to an embodiment of the present invention.

For example, as illustrated in FIG. 6A, when a menu screen of the group account, which includes a first icon 510 for exiting from the group account, is provided through the second agent and the first icon 610 is selected by the participant, the participant exit request page is provided as illustrated in FIG. 6B. When a second icon 620 for exiting from the group account included in the participant exit request page is selected by the participant, the participant exit request is generated and transmitted to the participant management unit 260 by the second agent. Accordingly, the participant management unit 260 performs exit processing for the corresponding participant.

Referring to FIG. 2 again, the deposit and withdrawal management unit 270 processes a deposit event or a withdrawal event occurring for the group account in response to the request of the first agent. In particular, according to the present invention, the deposit and withdrawal management unit 270 may check whether a member (the host or the participant) registered on the group account deposits the membership fee by referring to the transaction ledger 230 and may generate and transmit a membership fee payment message to the member whose membership fee is not deposited.

Specifically, when a preset membership fee payment date arrives, the deposit and withdrawal management unit 270 checks the transaction ledger 230 to determine the member for which the deposit event does not occur on the membership fee payment date. Thereafter, the deposit and withdrawal management unit 270 generates the membership fee payment message for guiding the membership fee payment and transmits the generated membership fee payment message to the first or second agent of the determined member or to the first or second messenger agent of the determined member. In this case, the membership fee payment message may include the membership fee payment date, the membership fee to be paid, and the name of the member.

In an embodiment, when a membership fee payment request is generated from the member, the deposit and withdrawal management unit 270 may withdraw an amount according to a preset transfer condition from the withdrawal account of the member according to the preset transfer condition without setting a separate transfer condition and automatically deposit the amount into the group account. In this case, the preset transfer condition refers to a transfer condition in which the number for account to be deposited the amount is set as the account number of the group account and the deposit amount is set as the preset membership fee.

In the above-described embodiment, both of the number for account to be deposited the amount and the deposit amount are described as being set through the preset transfer condition, but in another embodiment, only the number for account to be deposited the amount may be automatically set as the account number of the group account under the preset transfer condition and the deposit amount may be input from the member.

Figure 7A:
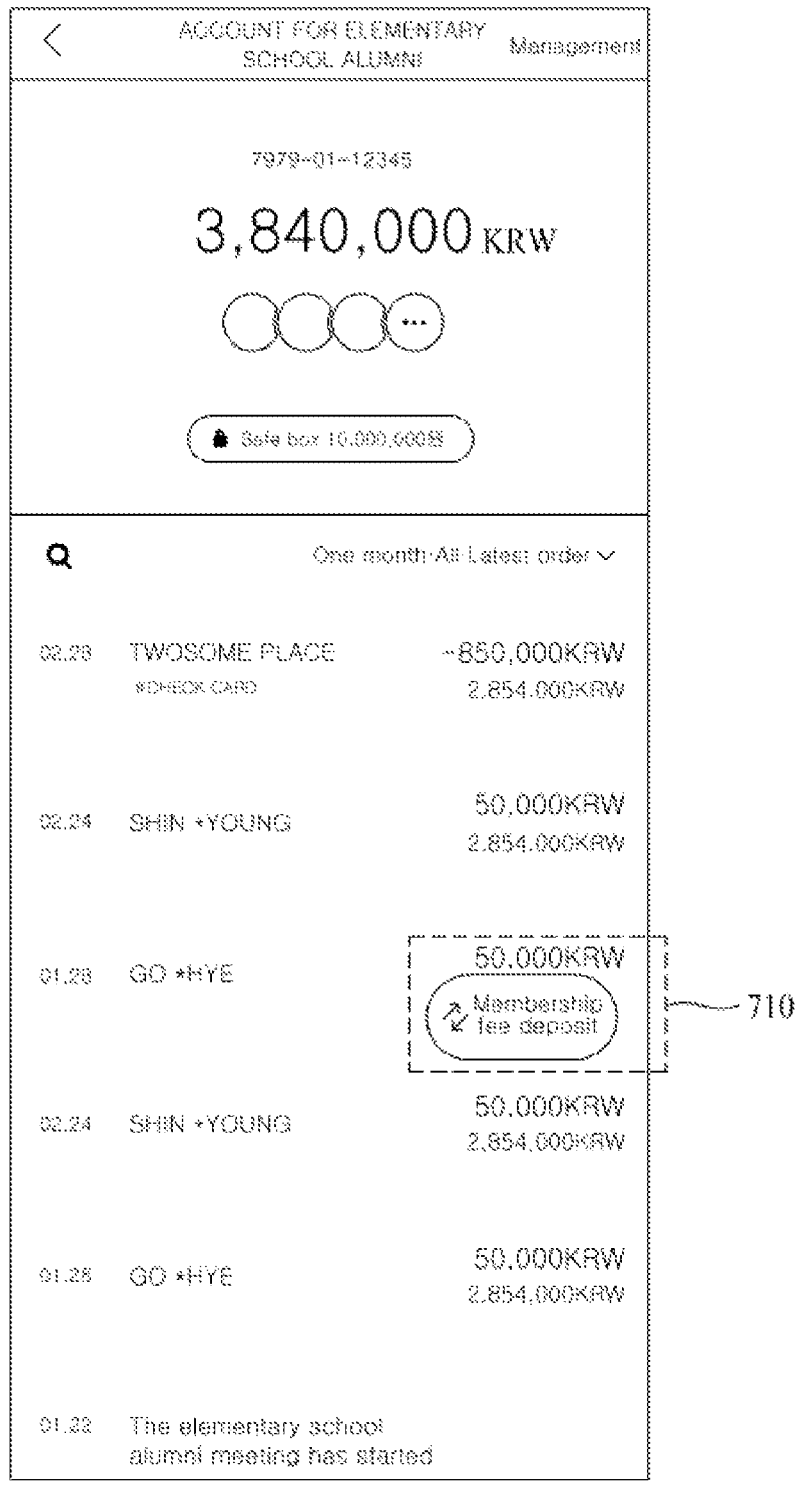
FIG. 7A is a view illustrating an example of a transaction history page including a membership fee deposit icon output on a second agent according to an embodiment of the present invention.
Figure 7B:
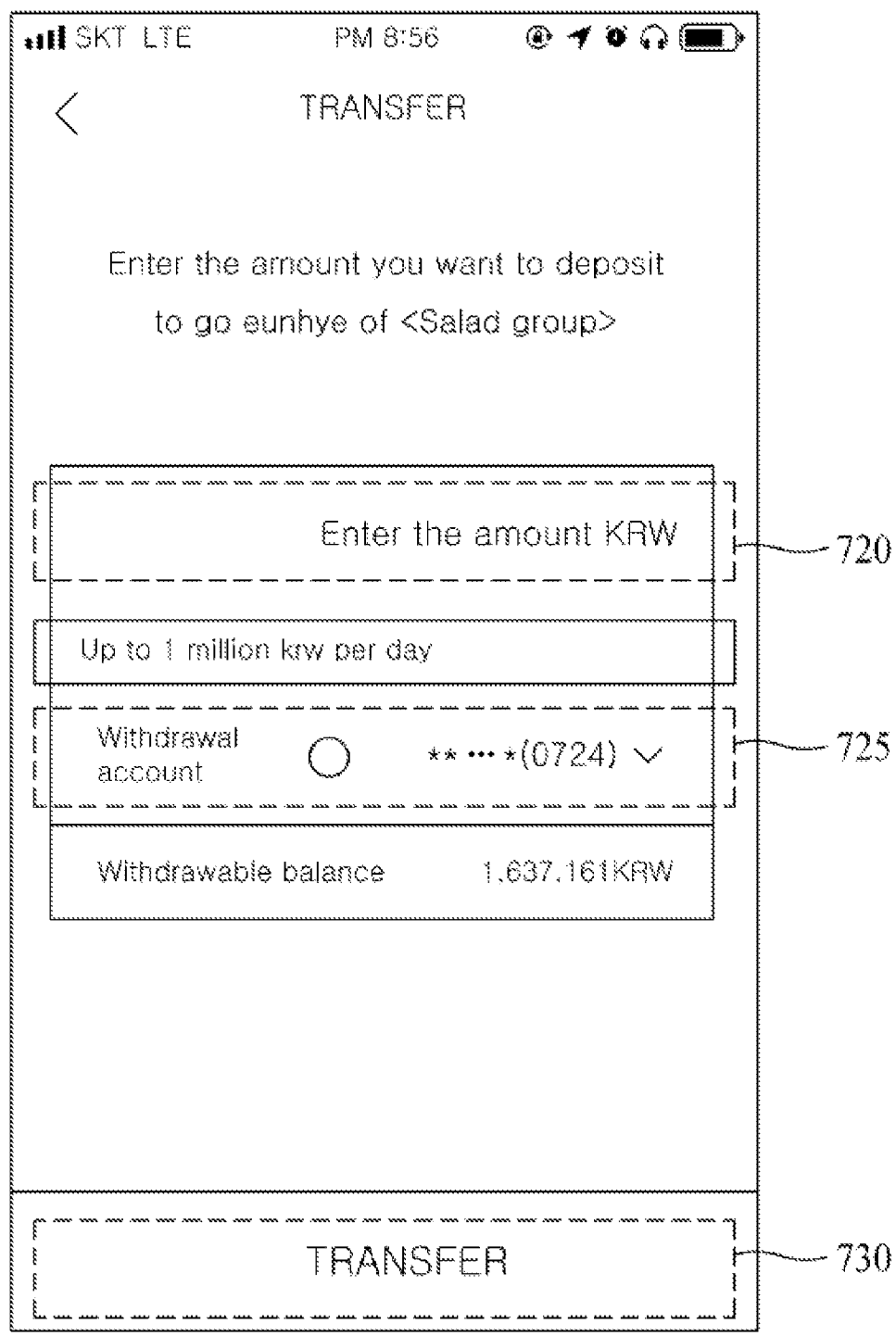
FIG. 7B is a view illustrating an example of a transfer page including a deposit amount input window and a withdrawal account selection window output on a second agent according to an embodiment of the present invention.

For example, when the participant selects a "group account" menu on the intro page, a transaction history page including a membership fee deposit icon 710 is provided through the second agent as illustrated in FIG. 7A. When the membership fee deposit icon 710 is selected by the participant, a transfer page, which includes a deposit amount input window 720 and a withdrawal account selection window 725, is provided as illustrated in FIG. 7B. After the deposit amount is input to the deposit amount input window 720 by the participant and the selection of the withdrawal account is completed in the withdrawal account selection window 725, when a transfer icon 730 is selected, the membership fee payment request is generated. When receiving the membership fee payment request, the deposit and withdrawal management unit 270 withdraws the deposit amount input to the deposit amount input window 720 from the withdrawal account selected in the withdrawal account selection window 725 and transfers the withdrawn amount to the group account.

Referring to FIG. 2 again, the deposit and withdrawal management unit 270 may withdrawal the membership fee from the withdrawal account set by the member on the preset membership fee payment date in response to a membership fee automatic transfer request set by the member and transfers the withdrawn membership fee to the group account.

Meanwhile, when a Dutch treat payment icon provided through the first and second agents of the members is selected by the member, the deposit and withdrawal management unit 270 generates a Dutch treat payment request, withdrawals a shared amount included in the Dutch treat payment request from the withdrawal account set by the member in response to Dutch treat payment request, and deposits the shared amount to the group account. In this case, the deposit and withdrawal management unit 270 may check the shared amount included in Dutch treat payment request from the Dutch treat payment request registered in the transaction ledger 230.

As described above, when the Dutch treat payment icon is selected by the member, the deposit and withdrawal management unit 270 automatically sets the amount to be withdrawn and the deposit account, and thus convenience may be increased when it is performed to transfer based on the Dutch treat.

The search unit 280 searches a membership fee payment history recorded in the transaction ledger and classifies and provides a result of the search according to at least one of the membership fee payment date and the name of the member. Here, the membership fee payment date may be classified by month or year. For example, the search unit 280 may classify the membership fee payment history into the membership fee for this month, last month, or this year. As another example, the search unit 280 may classify the membership fee payment history into the membership fee for this month and the accumulated membership fee.

In an embodiment, when receiving a membership fee payment search request generated by the host from the first agent, the search unit 280 may provide the search result corresponding to the membership fee payment search request to the host through the first agent. In this case, the membership fee payment search request may include the membership fee payment date or the name of the member to be searched.

When the search result is generated, the search unit 280 may generate the generated search result in the form of a message and provide the generated search result to the participant through the second messenger agent or the second agent.

Figure 8A:
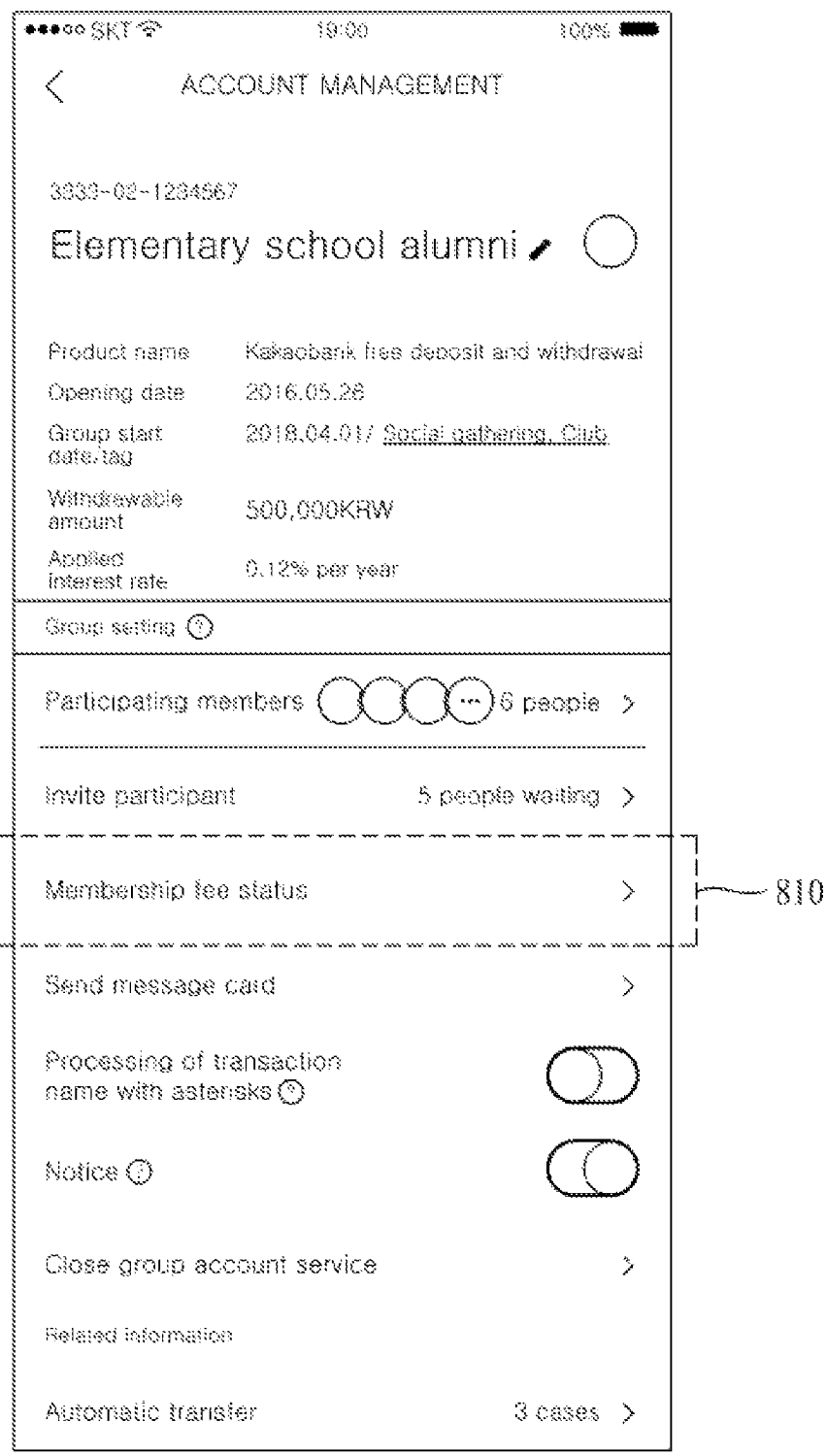
FIGS. 8A, 8B, 8C and 8D are views illustrating examples of a membership fee payment history page output on a first agent according to an embodiment of the present invention.
Figure 8B:
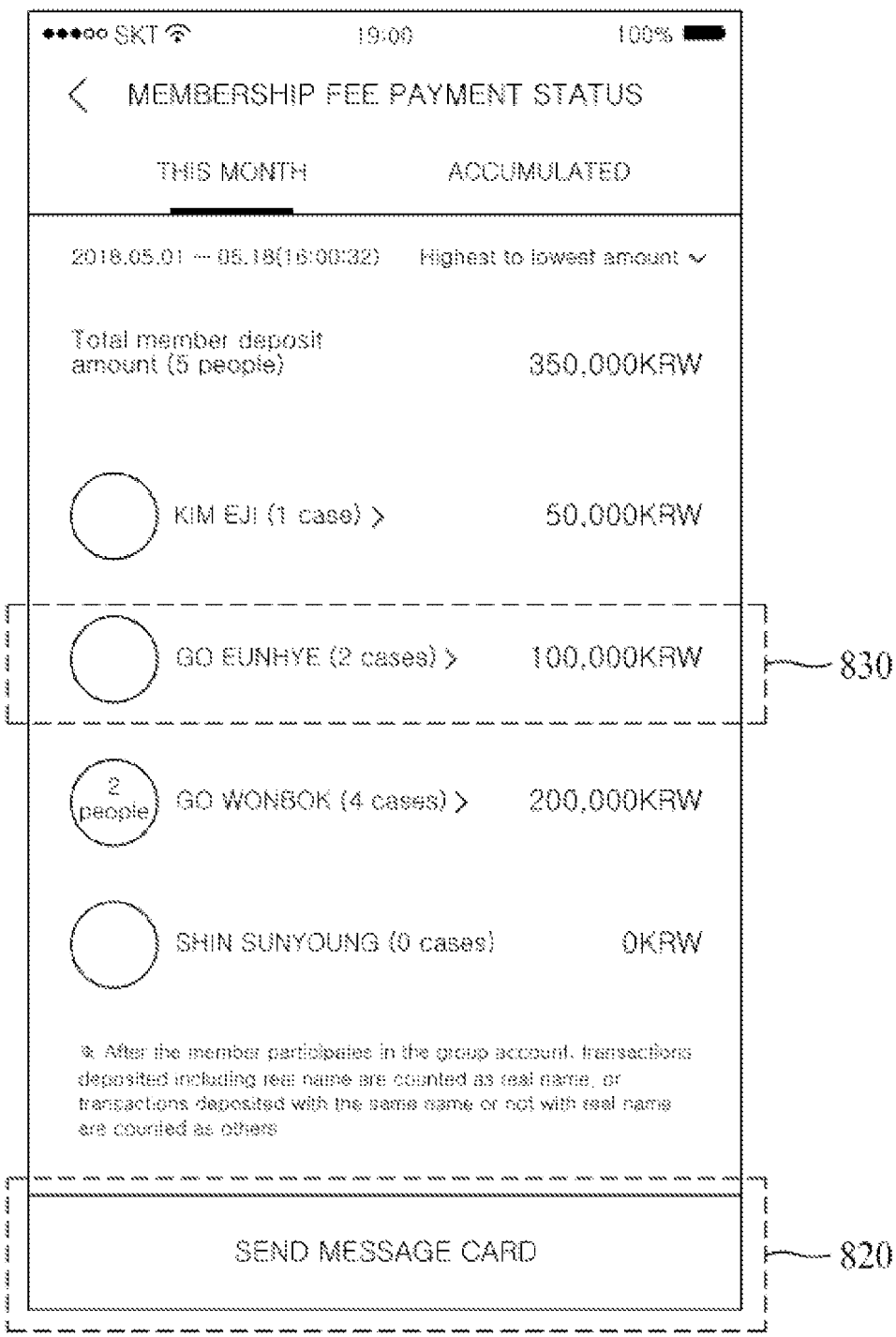

When a "membership fee status" icon 810 is selected by the host on the account management page, which includes the "membership fee status" icon 810, as illustrated in FIG. 8A, the search unit 280 provides a membership fee deposit status page, which includes the membership fee deposit history for each member as illustrated in FIG. 8B, to the host through the first agent. As illustrated in FIG. 8B, it can be seen that the membership fee deposit history is classified into the membership fee deposit for this month and the accumulated membership fee deposit and that the membership fee deposit history is classified and provided by the name of each member. Here, the accumulated membership fee deposit may refer to the membership fee accumulated from the opening date of the group account to the present.

Figure 8C:
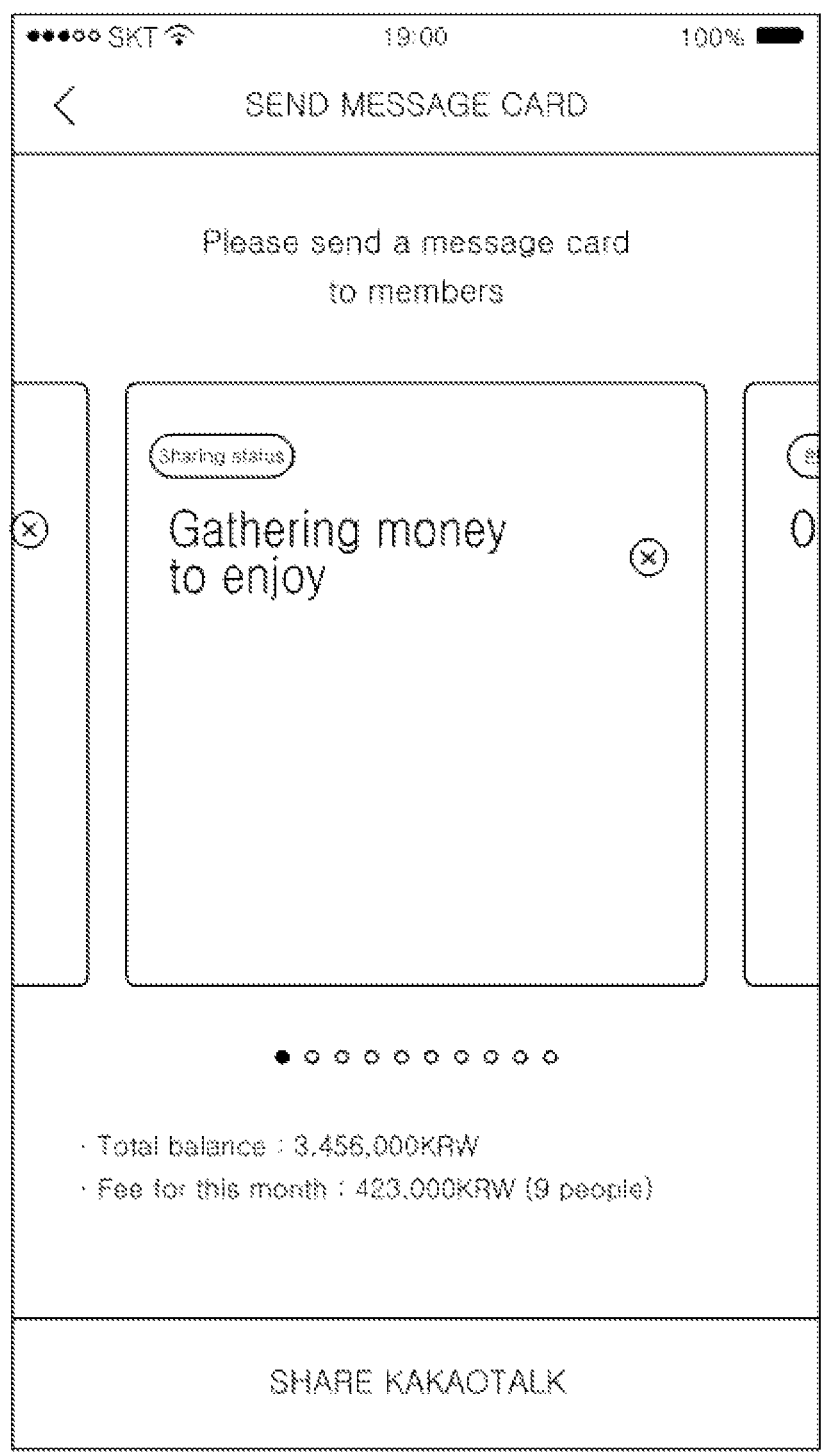

When a first message card send button 820 is selected by the host on the membership fee deposit status page as illustrated in FIG. 8B, the search unit 280 generates a search result which includes the membership fee deposit status of all the members in the form of a message as illustrated in FIG. 8C and provides the search result to each member through the second agent or the second messenger agent.

Figure 8D:
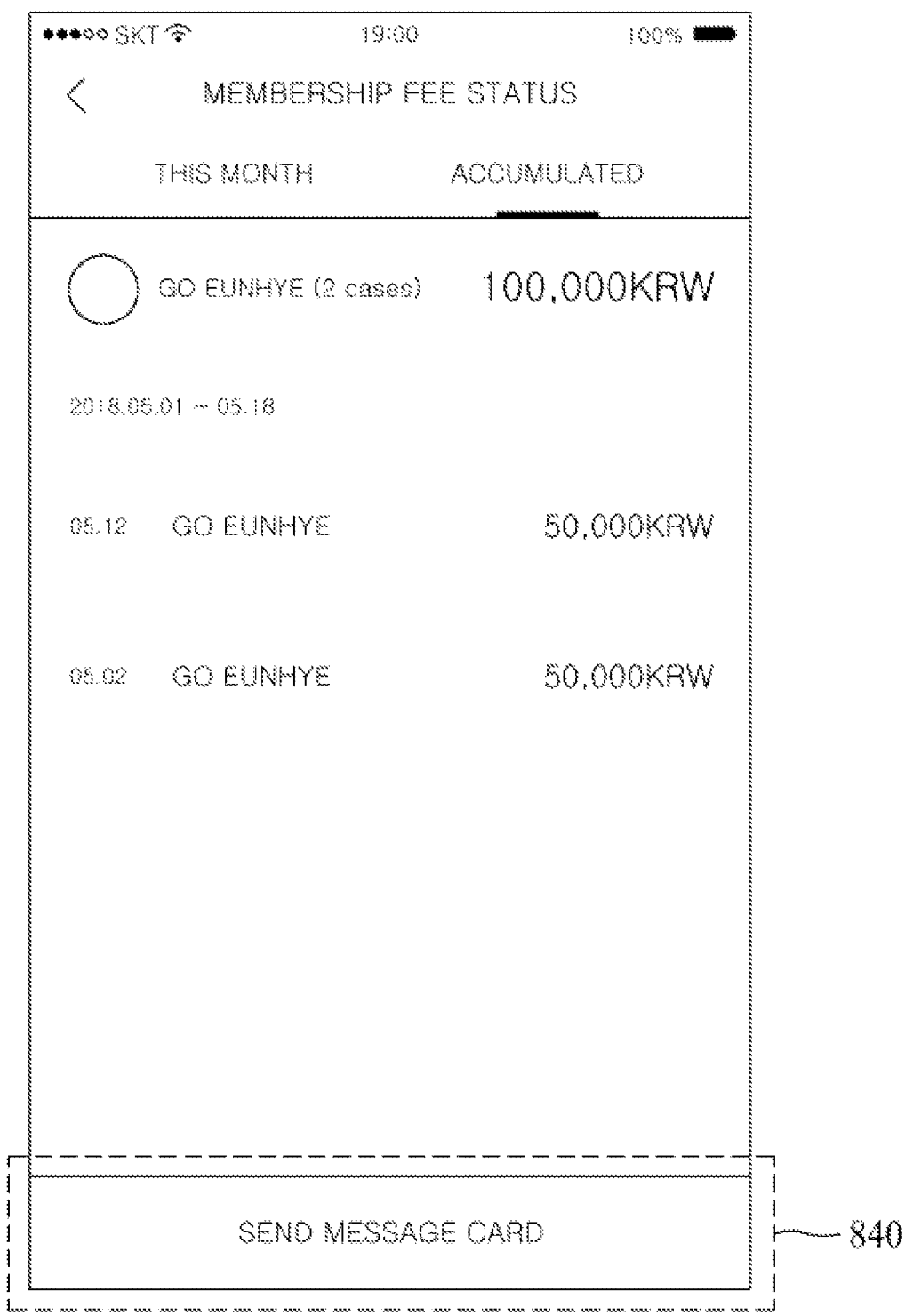

As another example, when any one member 830 among the members is selected by the host on the membership fee deposit status page as illustrated in FIG. 8B, the search unit 280 provides the membership fee deposit status page which includes the membership fee deposit history of the corresponding member as illustrated in FIG. 8D to the host through the first agent. As illustrated in FIG. 8D, it can be seen that the membership fee deposit history of the corresponding member generated during a predetermined period of time is classified for each day and provided.

When a second message card send button 840 is selected by the host on the membership fee deposit status page as illustrated in FIG. 8D, the search unit 280 generates a search result which includes the membership fee deposit status of the corresponding member in the form of a message and provides the search result to the corresponding member through the second agent or the second messenger agent.

Referring to FIG. 2 again, the interface unit 290 provides the content of the transaction ledger 230 to the host through the first agent and provides the content of the virtual ledger 250 to the participant through the second agent.

That is, according to the present invention, the interface unit 290 provides the content of the transaction ledger 230 to the host and provides the content of the virtual ledger 250 to the participant so that the host and the participant may share the content of the transaction ledger 230 for the group account in real time.

In an embodiment, when masking processing for the group account is set by the account management unit 210, the interface unit 290 may mask some transaction occurrence events recorded in the virtual ledger and provide the masked transaction occurrence events to the participant through the second agent. A target of the masking processing may be at least a portion of the abstract included in the transaction occurrence event.

That is, since the interface unit 290 directly provides the content of the transaction ledger to the first agent of the host, the transaction history is provided in a non-masked status on the first agent whereas, since the interface unit 290 provides the content of the virtual ledger to the second agent of the participant, at least some transaction history is provided in a masked status on the second agent.

In the present invention, the reason for providing the unmasked transaction history on the first agent and providing the masked transaction history on the second agent is because the group account is shared with the plurality of participants so that the personal information of the host or the participant may be unintentionally exposed when the unmasked transaction history is provided to all the participants.

For example, in a transaction history 440a read by the host through the first agent as illustrated in FIG. 4A, all pieces of information are provided in an unmasked status whereas, in a transaction history 440b read by the participant through the second agent as illustrated in FIG. 4B, information may be provided in a status in which the second letter of the abstract is masked.

In FIG. 4B, although only the second letter of the abstract is illustrated as being masked, the first or third letter of the abstract may be masked or all the letters of the abstract may be masked.

Meanwhile, the interface unit 290 may output messenger profile information 450a about the members recorded in the transaction ledger or the virtual ledger on the first or second agent in the form of the same as that illustrated in FIG. 4A. As illustrated in FIG. 4A, the profile pictures of the host and the participant may be output as the messenger profile information 450a, and the profile pictures may be arranged sequentially starting from the host in the order of the participants who joined the group account. In an embodiment, the profile pictures of the host and the participant may be arranged so that at least a region 460 overlaps as illustrated in FIG. 4A.

Meanwhile, when the number of the host and the participants is greater than or equal to a reference number, the profile pictures of the participants and the host may be displayed up to the number of the profile pictures less than to the reference number without change, and the profile pictures of the participants and the host in which the number of the profile pictures is greater than or equal to the reference number may be replaced with one predetermined symbol and displayed. In an embodiment, as illustrated in FIG. 4A the profile picture may be replaced with a symbol 470, in which " . . . " is placed in a circle, and displayed.

In FIGS. 4A and 4C, the profile pictures are illustrated as being output as the information about the messenger profiles of the host and the participant, but this is only exemplary, and the names or nicknames of the host and the participant may be displayed as the information about the messenger profiles. Further, the profile pictures may be arranged in random order, and the profile pictures of the host and all the participants may be output regardless of the reference number.

Meanwhile, the interface unit 290 may display the group account and other accounts except for the group account on the first and second agents in different forms or may separate and display the group account and other accounts except for the group account in different regions. For example, the group account and the other accounts may be displayed in different colors or, as another example, the information about the group account may be displayed in a first region and the information about the other accounts except for the group account may be displayed in a second region. In an embodiment, the first region may be a region located below the second region, and the second region may be set to have a size greater than that of the first region. Accordingly, the visibility of the other accounts may be increased as compared to the group account.

In the above-described embodiment, when there are a plurality of group accounts, the interface unit 290 may sequentially place the group accounts in the second region in the order in which the group accounts are opened.

Figure 9:
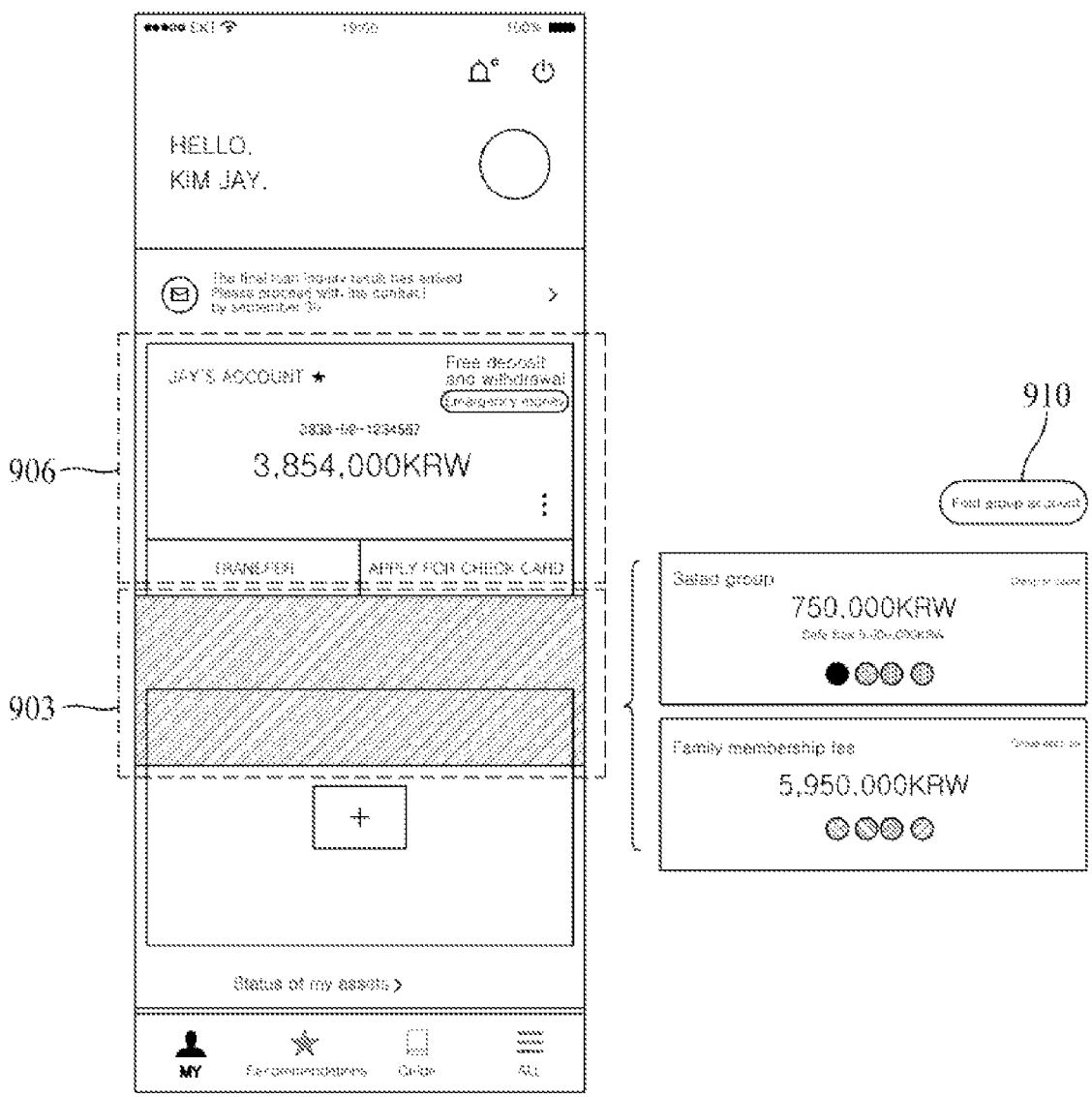
FIG. 9 is a view illustrating an example of an intro page for providing a banking service when a second agent is executed according to an embodiment of the present invention.

For example, as illustrated in FIG. 9, the interface unit 290 places the group account in a first region 903 and places the other accounts in a second region 906 located above the first region 903.

Further, when there are first and second group accounts, the interface unit 290 may place the first and second group accounts in the second region by overlapping some regions in the order in which the group accounts are opened. The first account opened first may be placed at the front end, and the second account may be placed at the rear end of the first account in the form in which some regions overlap.

In this case, the interface unit 290 may additionally provide a group account unfold icon, and thus the first and second accounts which overlap may be unfolded and displayed not to overlap a region different from the second region when the group account unfold icon is selected by the member.

Further, the group account fold icon 910 is provided while the first and second accounts are unfolded and displayed, and thus the first and second accounts which are unfolded are again placed so that some regions in the second region overlap each other when the group account fold icon 910 is selected by the member.

In FIG. 9, a group account fold icon 910 is illustrated, but this is only exemplary. When the group account unfold icon is selected, the group account unfold icon is changed to the group account fold icon 910, and when the group account fold icon 910 is selected, the group account fold icon 910 is changed to the group account unfold icon.

Hereinafter, a group account service providing method according to the present invention will be described in detail with reference to the accompanying drawings.

Figure 10:
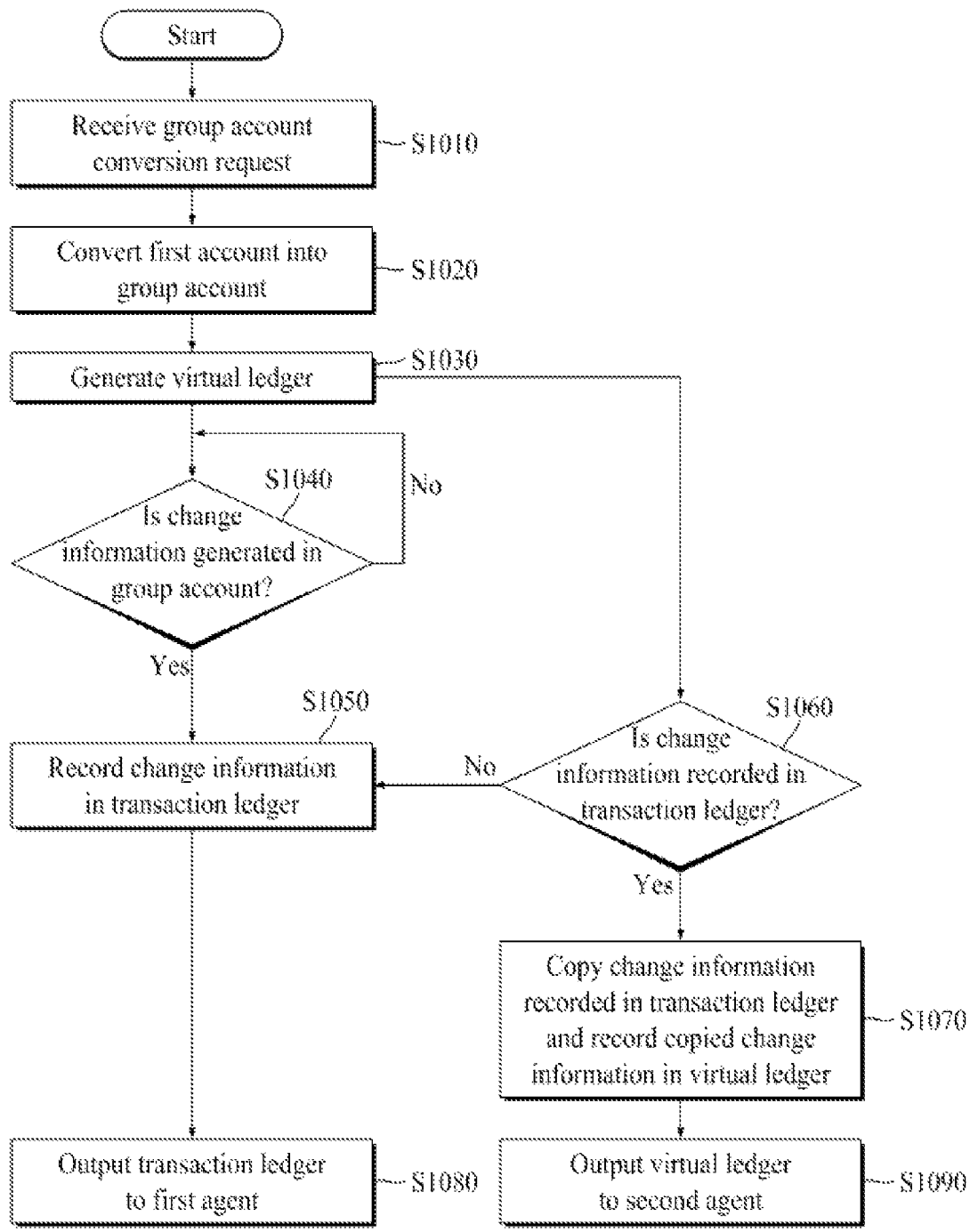
FIG. 10 is a flowchart illustrating a group account service providing method according to an embodiment of the present invention.

FIG. 10 is a flowchart illustrating a group account service providing method according to an embodiment of the present invention. The group account service providing method illustrated in FIG. 10 may be performed by the group account service providing server illustrated in FIG. 2.

The group account service providing server receives a group account conversion request from a first agent installed in a first terminal (S1010). The group account conversion request is for conversing a first account of a host to a group account. In an embodiment, the group account conversion request may include information about the first account which is a subject to be converted, a setting information about the group account to be generated, and additional information for the group account.

When the group account service providing server receives the group account conversion request from the first agent, the group account service providing server converts the first account, which is a subject to be converted, into the group account (S1020).

In an embodiment, when converting the first account into the group account, the group account service providing server may assign a safe account number different from a real account number for the first account to the group account. In the present invention, the reason for assigning the safe account number different from the real account number for the first account to the group account is because, according to the present invention, the first account opened under the real name of the host is converted into the group account and the group account is shared with participants so that the real account number for the first account may be revealed to the participants and personal information of the host may be leaked to the outside. In this case, the group account service providing server may output the real account number for the first account on the first agent and output the safe account number on a second agent installed in a second terminal of the participant.

Although not illustrated in FIG. 10, if the group account service providing server receives a group account dividing request from the first agent, the group account service providing server may open a child account whose parent account is the group account and which has at least some deposit amount of the parent account as a deposit amount thereof when the group account service providing server converts the first account into the group account. In this case, the group account service providing server may assign a first interest rate to the deposit amount of the parent account and assign a second interest rate different from the first interest rate to the deposit amount of the child account. The second interest rate may be set to be higher than the first interest rate.

When the first account is converted into the group account, the group account service providing server generates a virtual ledger for the group account (S1030). In the present invention, the reason for generating the virtual ledger for the group account is because the host may directly assess the transaction ledger but the participant may not directly assess the transaction ledger for the group account, which is an account of another person, and the virtual ledger in which the content recorded in the transaction ledger is copied and recorded may be generated so that the participant may read the virtual ledger, and thus the participant may feel substantially the same as when reading the transaction ledger.

The group account service providing server determines whether change information about the group account is generated (S1040). The group account service providing server records the generated change information when the change information about the group account is generated in the transaction ledger (S1050). In an embodiment, the change information about the group account may include at least one of a transaction occurrence event and an information occurrence event.

The transaction occurrence event may be a deposit event or a withdrawal event for the group account. When the transaction occurrence event such as the deposit event or the withdrawal event occurs for the group account, the group account service providing server may record the content of the event, which includes a transaction date and time, an abstract, a transaction amount, and a balance in the transaction ledger.

The information occurrence event may include at least one of memo related to deposit or withdrawal, a tag, registration or withdrawal information of the participant, announcement related to the group, a Dutch treat payment request, setting information about the group account, and additional information for the group account. Here, the tag is for distinguishing a representative transaction and, for example, when payment is made using a check card, a symbol "#check card" may be displayed. The setting information for the group account may include a name of the group, a category for the group, information about a messenger profile, a membership fee, and a membership fee payment date. The additional information for the group may include information about masking processing, information on whether the child account is generated, information about the child account, and information about the safe account number. Further, the information about the masking processing represents a request to mask some transaction occurrence events (e.g., at least some abstracts) recorded in the virtual ledger. In the present invention, the reason for performing the masking processing on some of the transaction occurrence events recorded in the virtual ledger according to the information about the masking processing is because the group account is shared with the plurality of participants so that the personal information of the host or the participant may be unintentionally exposed when the unmasked transaction history is provided to all the participants.

The group account service providing server monitors whether the change information is recorded in the transaction ledger (S1060), and when it is determined that the change information is recorded in the transaction ledger, the group account service providing server copies the change information recorded in the transaction ledger and records the copied change information in the virtual ledger (1070). That is, the group account service providing server monitors whether the transaction occurrence event or the information occurrence event is recorded in the transaction ledger, and when it is determined that the transaction occurrence event or the information occurrence event is recorded in the transaction ledger, the group account service providing server copies the transaction occurrence event or the information occurrence event and records the transaction occurrence event or the information occurrence event in the virtual ledger.

Thereafter, the group account service providing server outputs the content recorded in the transaction ledger to the first agent (S1080) and outputs the content recorded in the virtual ledger to the second agent (S1090).

As described above, according to the present invention, the group account service providing server may generate the virtual ledger, in which the content of the transaction ledger is copied and recorded, to provide the content of the transaction ledger to the host and provide the content of the virtual ledger to the participant, and thus the host and the participant may share the content of the transaction ledger for the group account in real time.

Hereinafter, a participant registration procedure will be described in detail with reference to FIG. 11. FIG. 11 is a flowchart illustrating a method of performing a participant registration procedure according to an embodiment of the present invention.

As illustrated in FIG. 11, a first terminal generates a participant registration request through a first agent and transmits the generated participant registration request to a group account service providing server (S1110). In an embodiment, the participant registration request may be generated by selecting at least one target person from among a list of persons registered in a first messenger agent installed in the first terminal by a host on the first agent. In this case, the group account service providing server may classify and output a list of persons registered in the first messenger agent on the first agent into previously invited persons, uninvited persons, and persons waiting to be accepted.

In another embodiment, the participant registration request may be generated by selecting all persons registered in a chat room opened on the first messenger agent by the host on the first agent.

When receiving the participant registration request from the first terminal, the group account service providing server generates a participant subscription request message (S1120) and transmits the generated participant subscription request message to a second messenger agent installed in a second terminal of the target person (S1130). In this case, when there are a plurality of target persons, the group account service providing server generates a participant subscription request message for all the target persons requested for registration and transmits the participant subscription request message to a second agent installed in the second terminal for each target person.

Thereafter, the second terminal generates an account subscription acceptance message and transmits the generated account subscription acceptance message to the group account service providing server (S1140). Specifically, when the participant subscription request message is selected by the target person on the second messenger agent, the second terminal executes the second agent to generate the account subscription acceptance message using the second agent.

In the above-described embodiment, the group account service providing server is described as transmitting the participant subscription request message to the second messenger agent but, in another embodiment, the group account service providing server may directly transmit the participant subscription request message to the second agent. In this case, when the second agent is executed by the target person to select the participant subscription request message, the second terminal may generate the account subscription acceptance message.

When receiving the account subscription acceptance message from the second terminal, the group account service providing server registers the target person as the participant of the group account (S1150) and records participant registration information for the target person in the transaction ledger (S1160). In this case, the group account service providing server may receive information about a messenger profile of the host and information about a messenger profile of the participant, which are obtained from the first messenger agent, from the first agent and record the information of the messenger profile of the host and the information of the messenger profile of the participant in the transaction ledger.

When the participant registration information is recorded in the transaction ledger, the group account service providing server copies the participant registration information recorded in the transaction ledger and records the copied participant registration information in the virtual ledger (S1170). The participant registration information is recorded in the virtual ledger, and thus the participant registration procedure for the target person is completed.

Thereafter, the group account service providing server outputs the content recorded in the transaction ledger to the host (S1180) and outputs the content recorded in the virtual ledger to the target person registered as the participant (S1190). In this case, the group account service providing server may sequentially place and output the messenger profiles recorded in the transaction ledger and the virtual ledger in a predetermined region on the first or second agent so that the messenger profiles overlap some neighboring messenger profiles.

In FIGS. 10 and 11, the group account service providing server is described as performing only the conversion into the group account and the participant registration procedure, but the group account service providing server according to the present invention may perform a general banking service such as deposit processing or withdrawal processing for the group account.

For example, when a membership fee payment request is generated by the member (the host or the participant), the group account service providing server may perform membership fee payment processing. In particular, when the membership fee payment is performed, the group account service providing server according to the present invention may withdraw an amount according to a preset transfer condition from a withdrawal account of the member according to the preset transfer condition without setting a separate transfer condition and automatically deposit the amount into the group account.

In an embodiment, the preset transfer condition may refer to a transfer condition in which the number for an account to be deposited the membership fee is set as the account number for the group account and the deposit amount is set as the preset membership fee. In another embodiment, the preset transfer condition may refer to a transfer condition in which only the number for the account to be deposited the membership fee is automatically set as the account number for the group account, and the deposit amount may be directly input from the member.

Meanwhile, the group account service providing server according to the present invention may process a Dutch treat request. Specifically, when the Dutch treat request is generated by the first agent, the group account service providing server provides a Dutch treat payment icon through the first and second agents. When a Dutch treat payment request is generated by selecting the Dutch treat payment icon by the member, the group account service providing server receives the Dutch treat payment request and performs the Dutch treat payment processing. While the Dutch treat payment processing is performed, the group account service providing server checks information about the withdrawal account of the member in the Dutch treat payment request and withdraws the shared amount from the withdrawal account of the corresponding member to deposit the shared amount to the group account. In this case, the shared amount to be withdrawn may be obtained from the Dutch treat payment request registered in the transaction ledger.

The above description of the invention is only exemplary, and it will be understood by those skilled in the art that various modifications can be made without departing from the scope of the present invention and without changing essential features.

For example, the configuration of the group account service providing server illustrated in FIG. 2, the group account service providing method illustrated in FIG. 10, or the participant registration procedure illustrated in FIG. 11 may be implemented in the form of a program such as an application or an agent to be recorded on a medium capable of reading the corresponding program. When the group account service providing server, the group account service providing method, or the participant registration procedure according to the present invention is implemented as a program, the components illustrated in FIG. 2 and the operations illustrated in FIGS. 10 and 11 may be implemented as codes, and codes for implementing specific functions may be implemented as a single program or may be implemented by being divided into a plurality of programs.

When the present invention is implemented by being divided into a plurality of programs, the programs may be recorded on different media. For example, some of the functions may be installed in the group account service providing server, and the remaining functions may be implemented as the first agent or the second agent and installed in the first terminal or the second terminal.

Therefore, the above-described embodiments should be considered in a descriptive sense only and not for purposes of limitation. Accordingly, the scope of the invention is not limited by the embodiments. The scope of the invention is defined by the appended claims and encompasses all modifications and equivalents that fall within the scope of the appended claims.

What is claimed is:

1. A user terminal comprising a graphical user interface (GUI) configured to provide secure data communication with a server in a communication network, the user terminal comprising:
a communication unit configured to communicate data with the server;
a memory storing instructions; and
a processor configured to execute the instructions to:
cause the server to:
generate multiple graphical messenger profiles corresponding to participants joined a group account, the group account being converted from a private account owned by a user of the user terminal;
control a transaction ledger to store the multiple graphical messenger profiles; and
control an interface unit of the server to send the multiple graphical messenger profiles to the user terminal, wherein a first graphical messenger profile of the multiple graphical messenger profiles is displayed in a first location of a first portion of a screen of the user terminal and a second graphical messenger profile of the multiple graphical messenger profiles is displayed in a second location of the first portion, the first location of the first portion and the second location of the first portion at least partially overlap and at least part of the first graphical messenger profile is covered by the second graphical messenger profile,
wherein the processor is configured to execute the instructions to:
in response to receiving an account conversion request to convert the private account in the group account, control the communication unit to send the account conversion request to the server, the account conversion request configured to cause the server to:
convert the private account into the group account and generate a group account information set including account information associated with the group account, the group account jointly accessible by at least the user of the user terminal and the user of a second user terminal,
control the transaction ledger of the server to store the group account information set and to store a conversion confirmation indicating that the private account has been converted into the group account, the transaction ledger configured to communicate data with the user terminal,
generate a virtual ledger of the server different from the transaction ledger, the virtual ledger configured to communicate data with at least the second user terminal,
in response to the virtual ledger being generated, copy the group account information set stored in the transaction ledger and to record the copied group account information set in the virtual ledger,
send the group account information set stored in the transaction ledger to the user terminal, and
send the group account information set stored in the virtual ledger to the second user terminal, wherein the group account information set stored in the virtual ledger is displayed at least on a screen of the second user terminal, and the second user terminal has access only to the group account information set in the virtual ledger and is prevented from accessing the group account information set in the transaction ledger,
wherein the processor is further configured to execute the instructions to:
in response to receiving a desired change request from a GUI configured to receive one or more user inputs and display data received from the server, send the desired change request to the server, the desired change request configured to cause the server to:
modify the group account information set stored in the transaction ledger based on the desired change request to generate a first updated group account information set,
control the transaction ledger to store the first updated group account information set thereon,
send the first updated group account information set stored in the transaction ledger to the user terminal,
in response to the first updated group account information set being stored in the transaction ledger, modify the group account information set stored in the virtual ledger to generate a second updated group account information set, wherein the second updated group account information set is the same as the first updated group account information set,
control the virtual ledger to store the second updated group account information set thereon, and
send the second updated group account information set stored in the virtual ledger to the second user terminal, wherein the second updated group account information set stored in the virtual ledger is displayed at least on a screen of the second user terminal.

2. The user terminal of claim 1, wherein the processor is configured to execute the instructions to cause the server to:
in response to the multiple graphical messenger profiles being stored in the transaction ledger, control the virtual ledger to store the multiple graphical messenger profiles; and
control the interface unit of the server to send the multiple graphical messenger profiles to the second user terminal, wherein the first messenger profile is displayed in a first location of a third portion of the screen of the second user terminal and the second graphical messenger profile is displayed in a second location of the third portion, the first location of the third portion and the second location of the third portion at least partially overlap and at least part of the first graphical messenger profile is covered by the second graphical messenger profile.

3. The user terminal of claim 1, wherein:
the processor is configured to execute the instructions to cause the server to generate a transaction history:
the transaction ledger of the server further stores the transaction history and the interface unit of the server further sends the transaction history to the user terminal;

the transaction history is displayed on a second portion of the screen of the user terminal;

the account information associated with the private account further comprises a first transaction history; and the account information associated with the group account further comprises a second transaction history different from the first transaction history.

4. The user terminal of claim 1, wherein a first account number of the private account and a second account number of the group account are different.

5. The user terminal of claim 1, wherein the processor is further configured to cause the server to:

mask at least a portion of information contained in the group account information set stored in the virtual ledger and in the second updated group account information set stored in the virtual ledger, wherein when the group account information set or the second updated group account information set stored in the virtual ledger is displayed on the screen of the second user terminal, the masked portion of information is absent or redacted.

6. The user terminal of claim 1, wherein the processor is further configured to cause the server to:

monitor in real time whether a change has occurred in the group account information set stored in the transaction ledger;

in response to determining that the change has occurred in the group account information set stored in the transaction ledger, copy, in real time, changed information from the group account information stored in the transaction ledger into the group account information set stored in the virtual ledger; and send the changed information in the group account information set stored in the virtual ledger to the second user terminal to provide the second user terminal with real time updates.

7. The user terminal of claim 1, wherein the account conversion request includes:

setting information, the setting information comprising a name of the private account to be converted into the group account and any tags associated with the group account; and additional information, the addition information comprising at least one of a masking instruction, a membership fee amount, an account number of any sub account, or a safe account number.

8. The user terminal of claim 7, wherein the setting information further comprises a participant registration request configured to cause the server to:

generate a subscription message request;

send the subscription request message to a second user terminal, wherein the subscription request message is displayed at least on the screen of the second user terminal;

upon receiving a subscription acceptance message, generated by the second user terminal, determine that the subscription acceptance message includes a confirmation to the participant registration request; and record the confirmation in the group account information set in the transaction ledger.

9. The user terminal of claim 1 further comprising:

the GUI configured to receive one or more user inputs and display data received from the server, the GUI comprising:

display a first instruction set configured to convert the private account to the group account, the private account having a first account number and comprising a private account information set including account information associated with the private account, and the group account having a second account number and comprising a group account information set including account information associated with the group account, receive a first user input comprising the first instruction set, the first instruction set comprising:

an account selection option configured to allow the user of the user terminal to choose a specific private account, and an account conversion request option configured to allow the user to submit the account conversion request, a second screen configured to display the group account information set received from the server.

10. The user terminal of claim 9, wherein the GUI further comprises:

a third screen configured to:

display a second instruction set; and receive a second user input comprising the second instruction set, the second instruction set comprising an account changing option configured to allow the user of the user terminal to update the group account information set stored in the transaction ledger.

11. A method of providing secure data communication with a server in a communication network, the method comprising:

establishing, by a communication unit, a communication link with the server;

controlling, by a processor, the communication unit to send one or more instructions configured to cause the server to:

generate multiple graphical messenger profiles corresponding to participants joined a group account, the group account being converted from a private account owned by a user of a first user terminal;

control a transaction ledger to store the multiple graphical messenger profiles; and control an interface unit of the server to send the multiple graphical messenger profiles to a first user terminal, wherein, a first graphical messenger profile of the multiple graphical messenger profiles is displayed in a first location of a first portion of a screen of the first user terminal and a second graphical messenger profile of the multiple graphical messenger profiles is displayed in a second location of the first portion, the first location of the first portion and the second location of the first portion at least partially overlap and at least part of the first graphical messenger profile is covered by the second graphical messenger profile, in response to receiving an account conversion request to convert the private account in the group account, controlling, by the processor, the communication unit to send the account conversion request to the server, the account conversion request configured to cause the server to:

convert the private account into the group account and generate a group account information set including account information associated with the group account, the group account jointly accessible by at least the user of the first user terminal and a user of a second user terminal, control the transaction ledger of the server to store the group account information set and to store a conversion confirmation indicating that the private account has been converted into the group account, the transaction ledger configured to communicate data with the first user terminal, generate a virtual ledger of the server different from the transaction ledger, the virtual ledger configured to communicate data with at least the second user terminal, in response to the virtual ledger being generated, copy the group account information set in the transaction ledger and to record the copied group account information set in the virtual ledger, send the group account information set in the transaction ledger to the first user terminal, send the group account information set stored in the virtual ledger to the second user terminal such that the group account information set stored in the virtual ledger is displayed at least on a screen of the second user terminal, such that the second user terminal has access only to the group account information set in the virtual ledger and is prevented from accessing the group account information set in the transaction ledger, receiving a desired change request from a GUI; and in response to receiving the desired change request from the GUI, controlling, by the processor, the communication unit to send the desired change request to the server, the desired change request configured to cause the server to:

modify the group account information set stored in the transaction ledger based on the desired change request to generate a first updated group account information set, control the transaction ledger to store the first updated group account information set thereon, send the first updated group account information set stored in the transaction ledger to the first user terminal, in response to the first updated group account information set being stored in the transaction ledger, modify the group account information set stored in the virtual ledger to generate a second updated group account information set, wherein the second updated group account information set is the same as the first updated group account information set, control the virtual ledger to store the second updated group account information set thereon, and send the second updated group account information set stored in the virtual ledger to the second user terminal, wherein the second updated group account information set stored in the virtual ledger of the server is displayed at least on the screen of the second user terminal; and receiving, from the GUI, the first messenger profile associated with the user of the first user terminal and the second messenger profile associated with the user of the second user terminal.

12. The method of claim 11, further comprising:

in response to the multiple graphical messenger profiles being stored in the transaction ledger, controlling the virtual ledger to store the multiple graphical messenger profiles; and controlling the interface unit of the server to send the multiple graphical messenger profiles to the second user terminal, wherein, the first messenger profile is displayed in a first location of a third portion of a screen of the second user terminal and the second graphical messenger profile is displayed in a second location of the third portion, the first location of the third portion and the second location of the third portion at least partially overlap an at least part of the first graphical messenger profile is covered by the second graphical messenger profile.

13. The method of claim 11, wherein:

the server further generates a transaction history:

the transaction ledger of the server further stores the transaction history and the interface unit of the server further sends the transaction history to the first user terminal;

the transaction history is displayed on a second portion of the screen of the first user terminal;

account information associated with the private account further comprises a first transaction history; and the account information associated with the group account further comprises a second transaction history different from the first transaction history.

14. The method of claim 11, further comprising:

causing, by the processor, the server to mask at least a portion of information contained in the group account information set stored in the virtual ledger and in the second updated group account information set stored in the virtual ledger, such that when the group account information set or the second updated group account information set stored in the virtual ledger is displayed on the screen of the second user terminal, the masked portion of information is absent or redacted.

15. The method of claim 11, further comprising:

controlling, by the processor, the GUI to receive one or more user inputs and display data received from the server, the GUI comprising a first screen, the first screen configured to:

display a first instruction set configured to convert the private account to the group account, the private account having a first account number and comprising a private account information set including account information associated with the private account, and the group account having a second account number and comprising a group account information set including account information associated with the group account, and receive a first user input comprising a first instruction set, the first instruction set comprising:

an account selection option configured to allow the user of the first user terminal to choose a specific private account, and an account conversion request option configured to allow the user of the first user terminal to submit the account conversion request.

* * * * *